United States Patent [19]
Kawade et al.

[11] Patent Number: 5,255,258
[45] Date of Patent: Oct. 19, 1993

[54] MICROPROBE, PREPARATION THEREOF AND ELECTRONIC DEVICE BY USE OF SAID MICROPROBE

[75] Inventors: Hisaaki Kawade, Atsugi; Haruki Kawada, Yokohama; Kunihiro Sakai; Hiroshi Matsuda, both of Isehara; Yuko Morikawa, Kawasaki; Yoshihiro Yanagisawa, Atsugi; Tetsuya Kaneko, Yokohama; Toshimitsu Kawase; Hideya Kumomi, both of Atsugi; Hiroyasu Nose, Zama; Eigo Kawakami, Ebina, all of Japan

[73] Assignee: Canon Kabushiki Kaisha, Tokyo, Japan

[21] Appl. No.: 643,209

[22] Filed: Jan. 18, 1991

Related U.S. Application Data

[60] Division of Ser. No. 610,314, Nov. 9, 1990, Pat. No. 5,072,116, which is a continuation of Ser. No. 249,178, Sep. 26, 1988, abandoned.

[51] Int. Cl.⁵ ............................................. G11B 9/00
[52] U.S. Cl. ................................... 369/126; 369/101; 250/306
[58] Field of Search ............ 369/126, 101, 44.11, 369/125; 250/306, 307; 365/118

[56] References Cited

U.S. PATENT DOCUMENTS

| | | | |
|---|---|---|---|
| 4,343,993 | 8/1982 | Binnig et al. | 250/306 |
| 4,575,822 | 3/1986 | Quate | 365/174 |
| 4,831,614 | 5/1989 | Duerig et al. | 250/306 |
| 4,837,435 | 6/1989 | Sakuhara et al. | 250/306 |
| 4,870,352 | 9/1989 | Koechner | 250/307 |
| 4,918,309 | 4/1990 | Beha et al. | 250/307 |

FOREIGN PATENT DOCUMENTS

| | | | |
|---|---|---|---|
| 0027517 | 4/1981 | European Pat. Off. | |
| 0194323 | 9/1986 | European Pat. Off. | |
| 272935 | 6/1988 | European Pat. Off. | 369/101 |
| 72662 | 4/1984 | Japan | 369/126 |
| 62-209302 | 3/1988 | Japan | |

OTHER PUBLICATIONS

Applied Physics Letters. vol. 50. No. 11, Mar. 16, 1987, New York, U.S.A., pp. 696-698 D. K. Biegelsen et al: "Ion Milled Tips For Scanning Tunneling Microscopy".

Helvetica Physica Acta vol. 55, Dec. 30, 1982, Basel pp. 726-735; G. Binnig et al; "Scanning Tunneling Microscopy".

*Primary Examiner*—W. R. Young
*Assistant Examiner*—Muhammed Edun
*Attorney, Agent, or Firm*—Fitzpatrick, Cella, Harper & Scinto

[57] ABSTRACT

A microprobe is provided which comprises a single crystal provided on a part of one main surface of a substrate or a part of a thin film formed on one main surface of the substrate. The microprobe may have a single crystal having an apex portion surrounded by facets having a specific plane direction and comprising a specific crystal face. The method for preparing the microprobe and an electronic device employing the microprobe also provided which is useful for recording and reproducing.

20 Claims, 20 Drawing Sheets

XY COORDINATE
FOR Si(III)

XY COORDINATE
FOR Gd-As(110)

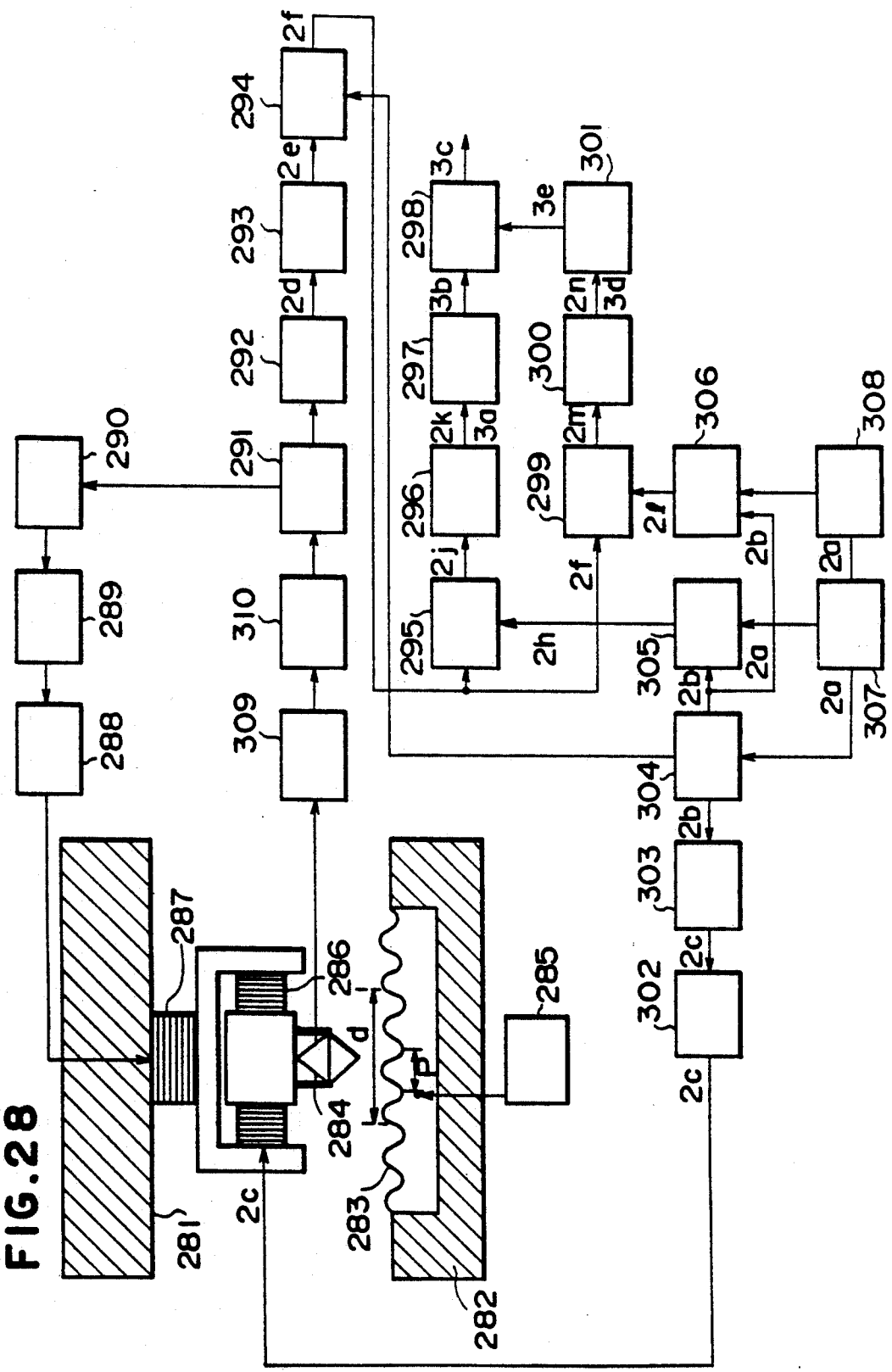

FIG.30
3a
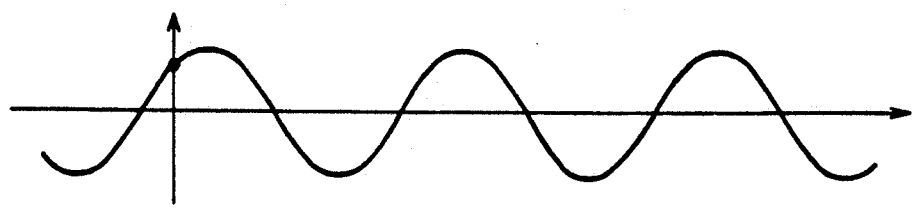
3b
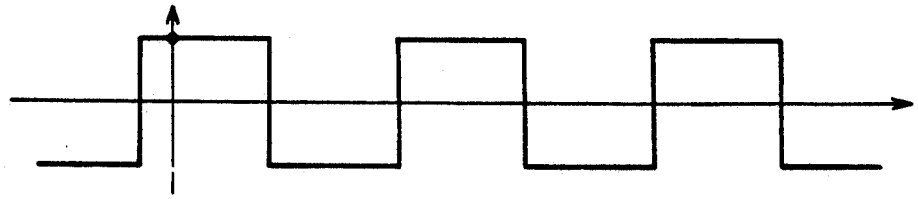
3c
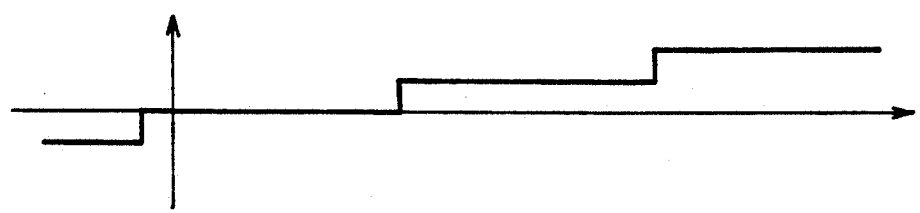
3d
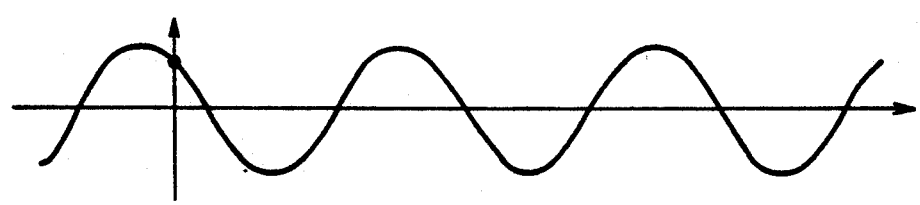
3e
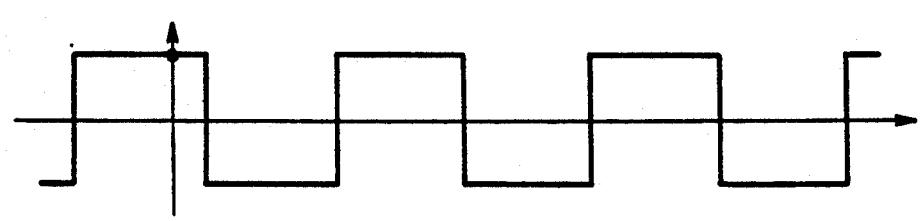

MICROPROBE, PREPARATION THEREOF AND ELECTRONIC DEVICE BY USE OF SAID MICROPROBE

This application is a division of application Ser. No. 07/610,314 filed Nov. 9, 1990 (now U.S. Pat. No. 5,072,110) which is a continuation of application Ser. No. 07/249,178 filed on Sep. 26, 1988 now abandoned.

BACKGROUND OF THE INVENTION

1. Field of the Invention

This invention relates to a microprobe having an extremely small radius of curvature at the tip end portion which is used for a probe for measurement of muscle activity current, a probe for STM (Scanning Tunneling Microscope), a probe for high density recording-reproduction device or a probe utilized for an encoder which performs positional information measurement in micropositional determination, dimensional measurement, distance measurement, speed measurement, etc.

2. Related Background Art

In recent years, the recording capacity of data in recording-reproduction devices has become increasingly greater, and the size of recording units has become smaller, while the recording density higher. For example, in digital audio disc, the size of the recording unit has become even about 1 $\mu m^2$. There is active development of memory materials in its background, and an inexpensive and high density recording medium by use of an organic thin film of an organic dye, a photopolymer, etc. is now appearing on the market.

On the other hand, a Scanning Tunneling Microscope (hereinafter abbreviated as STM) capable of observing directly the electron structure of the surface atoms of a conductor has been developed (G. Binnig et al, Helvetica Physica Acta. 55, 726 (1982)] and it has become possible to measure real space image with high resolution regardless of whether it is single crystal or amorphous, and there is also the advantage that observation is possible at low power without damaging the medium. Further, it can be also used for various materials through actuation in the atmospheric environment, and therefore a broad scope of lications are expected therefor.

The STM utilizes the phenomenon that tunnel current will flow when a probe of a metal (probe electrode) and an electroconductive substance are brought near to a distance of about 1 nm under application of a voltage therebetween. The current is very sensitive to the distance change between the two, and by scanning the probe so that the current or the average distance between the both may be maintained constant, surface information of the real space can be obtained. In this case, the resolving power in the plane direction is about 1 Å.

By applying the principle of STM, it is possible to perform high density recording and reproduction sufficiently on the atomic level (several Å). As the method for recording and reproduction in this case, it has been proposed to perform recording by changing the surface state of an appropriate recording layer by use of a particle ray (electron beam, ion beam) or a high energy electromagnetic wave such as X-ray and an energy ray such as a visible ray, a a UV-ray, etc. and effect reproduction by STM, or to perform recording and reproduction by means of STM by use of a thin film layer of a material having a memory effect for the switching characteristic of voltage and current as the recording layer, for example, a $\pi$-electron-system organic compound or a chalcogenide as the recording layer.

For performing recording and reproduction on the molecular level, the recording density becomes higher as the radius of curvature of the probe tip end opposed to the recording layer is smaller. Therefore a probe is desired ideally which has a sharpness of as small as about an atom level.

For measuring the muscle activity current of a human body, since a single cell of a human body has a small size of about 2 $\mu m$, the radius of curvature of the tip portion of microprobe is required to be smallest.

Further, an encoder is constituted of a standard scale having the information concerning position or angle and a detecting means for detecting the information concerning position or angle by moving relatively thereto. The encoders are classified into several types depending on the standard scale and the detecting means, such as the optical encoder, the magnetic encoder, the capacitance encoder, etc.

As the encoder having resolving power of atomic level, there is the parallel movement detecting device disclosed in Japanese Laid-open Patent Publication No. 62-209302 applying the basic principle of Scanning Tunneling Microscope disclosed in U.S. Pat. No. 4,343,993 which is capable of observing the information of a sample surface with atomic-level resolving power as already known.

In the prior art, such an encoder is provided with a standard scale concerning length and a probe provided in proximity to the scale, and has the function of encoding by signal processing of the information from the tunnel current flowing between the standard scale provided with a driving mechanism and a probe as the signal source.

The probe for detecting the tunnel current of the above encoder is required to have a small radius of curvature at the tic end in order to provide a high performance and high resolution encoder.

In the prior art, the probe having such a tip with a small radius of curvature has been prepared by use of mechanical polishing and electrolytic polishing. According to the mechanical polishing method, it is possible to prepare a probe having a fine tip portion with a radius of curvature of 5 to 10 $\mu m$ by cutting and polishing a wire of fibrous crystal (Pt, etc.) by means of a clock lathe. According to the electrolytic polishing method, a wire of 1 mm in diameter or less (W, etc.) is held vertical in the axis direction, dipped in an electrolyte to about 1 to 2 mm, and the wire is subjected to electrolytic polishing by application of a voltage between the wire and the opposed electrode in the electrolyte, whereby a probe having a fine tip of about 0.1 to 1 $\mu m$ radius of curvature can be prepared.

However, of the preparation methods of microprobe of the prior art as described above, the cutting method has the drawback that the probe will be soon bend because stress is applied on the probe, while the electrolytic polishing method, although a finer probe as compared with the cutting method can be prepared, his the drawback that it is extremely difficult to prepare a fine probe with a radius of curvature on the order of atomic or molecular level.

It is also difficult according to the method for preparing microprobe of the prior art to prepare a microprobe of which the radius of curvature at the tip is on atomic or molecular level with high reproducibility.

The probe electrode prepared according to the above method, because it is fixed on a device by holding with a screw or by spring force, is weak in rigidity so far as the tip of the probe electrode is concerned, namely having the drawback of low natural frequency.

By use of the probe prepared by the method of the prior art, because the tunnel current draw-out electrode is apart from the detecting portion, it is susceptible to acoustic vibration, floor vibration, electric noise, whereby the amount of the information detected by the probe is decreased.

Further, for example, in the high density recording-reproduction device as mentioned above, since recording or reproduction of data is performed by scanning the XY stage while moving one probe, the movement distance of the probe becomes longer, whereby there is involved the drawback that the recording and reproduction becomes slow.

Thus, it has been desired to have a probe having a small radius of curvature of the tip.

SUMMARY OF THE INVENTION

The present invention has enabled performing recording and reproduction at high density and with high reliability or positional determination and measurement of length at high precision by use of a single crystal for the probe electrode.

More specifically, the present invention provides an electronic device by use of a probe electrode comprising a single crystal for recording and reproduction or an electronic device comprising an encoder by use of a probe electrode comprising a single crystal for positional determination and measurement of length, etc.

According to an aspect of the present invention, there is provided a microprobe, comprising a single crystal provided on a part of one main surface of a substrate or a part of a thin film formed on one main surface of this substrate.

According to another aspect of the present invention, there is provided a microprobe constituted of a single crystal having an apex portion surrounded by facets having a specific plane direction and comprising i specific crystal face.

According to still another aspect of the present invention, there is provided a method for preparing a microprobe, comprising the step of providing on a part of one main surface of a substrate or on a part of a thin film formed on one main surface of the substrate a different material having nucleation density sufficiently larger than the nucleation density of said substrate or thin film, and being small to such an extent that only a single nucleus can be grown thereon, and the step of forming a single crystal by growing a single nucleus on said material.

According to a further aspect of the present invention, there is provided a method for preparing a microprobe, comprising the step of laminating on a single crystal substrate an insulating layer having an opening so that a part of said single crystal substrate may be exposed, and the step of growing a single crystal having an apex portion surrounded by facets having a specific plane direction and comprising a specific crystal face by selective epitaxial growth from said opening.

According to a still further aspect of the present invention, there is provided an electronic device for performing recording and reproduction, having a probe electrode comprising a single crystal, a recording medium provided in opposition to skid probe electrode and a means for applying voltage between said probe electrode and said recording medium.

According to a still further aspect of the present invention, there is provided an electronic device, comprising an electroconductive standard scale which becomes the standard with respect to length, an electroconductive probe constituted of a single crystal with its tip being arranged in proximity to said standard scale face, a means for applying voltage between said standard scale and said probe, a means for detecting the tunnel current value flowing between said standard scale and said probe and outputting the signal corresponding to the relative movement amount in the lateral direction between said standard scale and said probe based on said tunnel current value, a means for detecting the relative movement amount and the relative movement direction in the lateral direction between said standard scale and said probe based on the outputting signal from said signal outputting means, and a means for counting the relative deviation amount in the lateral direction between said standard scale and said probe from the signals of said relative movement amount in the lateral direction and said relative movement direction.

BRIEF DESCRIPTION OF THE DRAWINGS

FIG. 28 is a constitutional diagram of the encoder by tunnel current detection according to an embodiment of the present invention;

FIG. 29 and FIG. 30 are waveforms showing the signals obtained in the respective constituent parts in FIG. 28.

DETAILED DESCRIPTION OF THE PREFERRED EMBODIMENTS

The microprobe of the present invention is formed of a single crystal.

The present invention has a specific feature in a microprobe constituted of a single crystal having an apex portion surrounded by facets having specific plane direction and comprising specific crystal faces.

More specifically, there is provided a method for preparing a microprobe, comprising a step of providing on one main surface of a substrate or on a desired part of a thin film formed on one main surface of said substrate another kind of material having sufficiently larger nucleation density than said substrate or thin film and being sufficiently small to the extent that only a single nucleus can be grown thereon, and a step of forming single crystal by growing a single nucleus on said material.

There is also provided a method for preparing a microprobe of a single crystal, having a step of laminating on a single crystal substrate an insulating layer having an opening so that a part of said single crystal substrate may be exposed, and a step of subjecting a single crystal having an apex portion surrounded by facets having specific plane directions and comprising specific crystal faces for selective epitaxial growth from said opening.

Further, the present invention provides an electronic device for performing recording and reproduction, having a probe electrode comprising a single crystal, a recording medium provided as opposed to said probe and a means for applying voltage between said probe electrode and said recording medium.

Also, the present invention provides an electronic device utilizing an encoder, having an electroconductive standard scale which becomes the standard with respect to length, an electroconductive probe constituted of a single crystal with its tip being placed in proximity to said standard scale face, a means for applying voltage between said standard scale and said probe, a means for detecting the tunnel current value flowing between said standard scale and said probe and outputting the signal corresponding to the relative movement amount in the lateral direction between said standard scale and raid probe based on said tunnel current value, a means for detecting the relative movement amount and the relative movement direction in the lateral direction between said standard scale and said probe based on the outputting signal from said signal outputting means, and a means for counting the relative deviation amount in the lateral direction between said standard scale and said probe from the signals of said relative movement amount in the lateral direction and said relative movement direction.

In the following, embodiments of the present invention are to be described.

Figure 1:
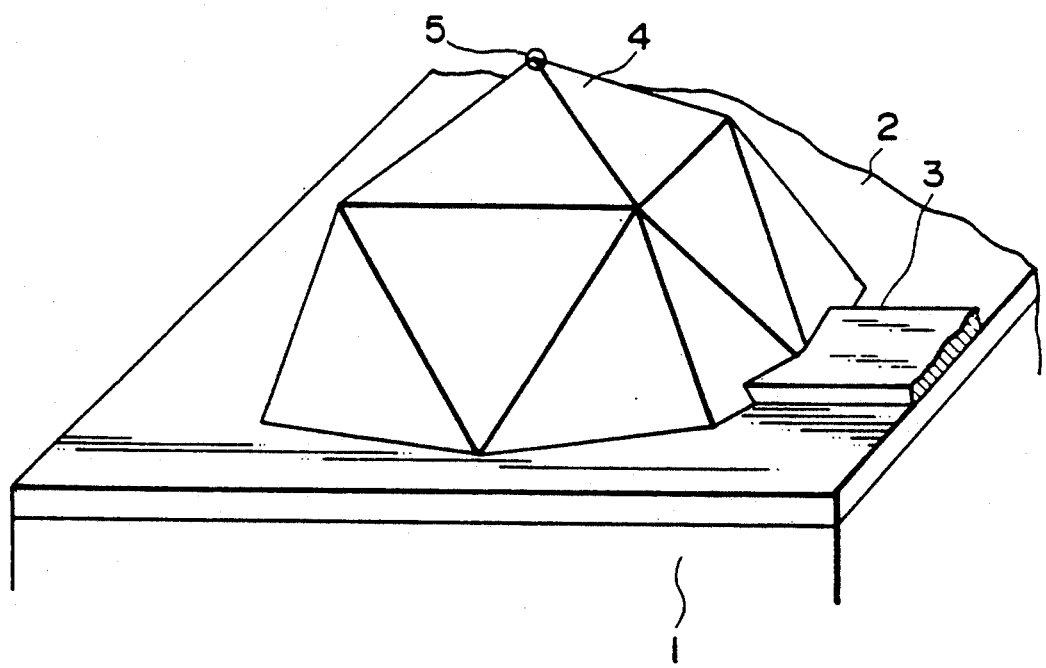
FIG. 1 is an appearance view of an embodiment of the present invention.

First, an example of microprobe appearance of the present invention is shown in FIG. 1. It exhibits an appearance provided with a single crystal probe having a thin film (insulating film) 2, an electrode 3 on a substrate 1 and an information reading portion 5 at the tip.

Figure 2:
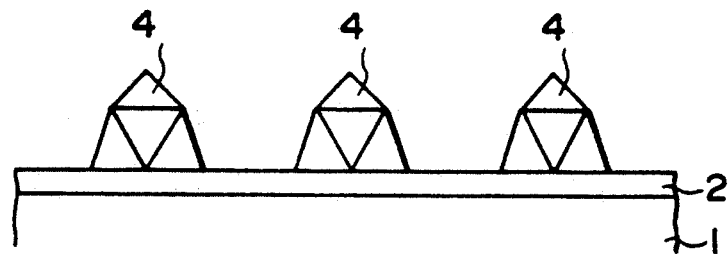
FIG. 2 is a sectional view of another embodiment of the present invention.

FIG. 2 is a side view of the embodiment in which the single crystal probe 4 formed according to the present invention is provided in a plural number.

Figure 3:
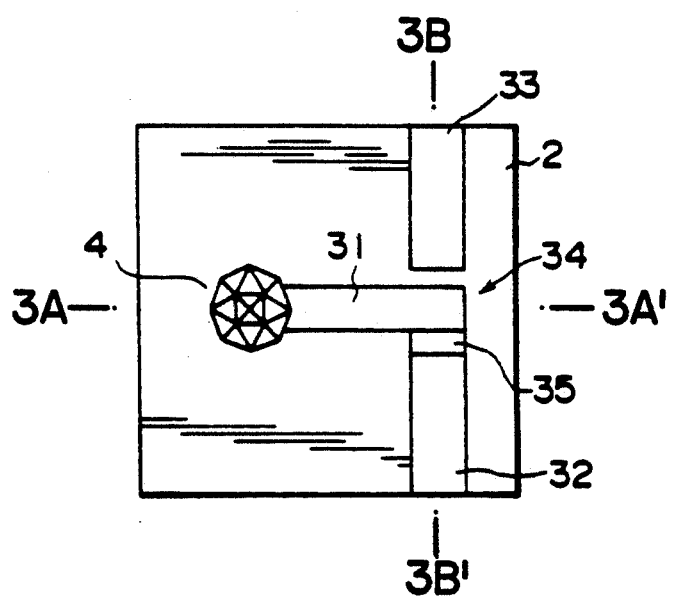
FIG. 3 is a plan view of the embodiment in which the present invention is applied for a current detecting probe.

Another embodiment of the present invention using the microprobe as the current detecting probe is shown in a plan view in FIG. 3.

In this embodiment, a single crystal probe 4 having an apex portion surrounded by specific facets is provided on a substrate (not shown in FIG. 3). In the vicinity of the single crystal probe W, a source electrode 32, a gate electrode 31, a drain electrode 33 and a thin film resistance 35 are provided. These constitute a MOS transistor 34 for amplifying the probe current. The probe current detected by the probe 4 is on the order of $10^{-9}$A, but a probe current on the order of $10^{-7}$A can be obtained by amplification with the MOS transistor 34. Also, since the probe current detected by the single crystal probe 4 is immediately amplified without being led out externally of the substrate, the S/N ratio can be improved to be far greater than where the probe current is amplified after lead out from the substrate.

Next, the method for preparing the current detecting probe in FIG. 3 is to be described.

FIG. 4 is a sectional view showing the first preparation step cut along the line A. 3A—3A' in FIG. 3.

FIG. 5 is a sectional view showing the first preparation step cut along the line 3B—3B' in FIG. 3.

As shown in FIG. 4, the microprobe of this embodiment has a different material 41 and a single crystal probe 4 comprising tungsten (W) formed on the basis of the different material 41 provided on the silicon oxide ($SiO_2$) film 2 formed on the silicon substrate 1. Further, in the vicinity of the single crystal probe 4, a MOS transistor 34 for amplifying the probe current is provided. The MOS transistor 34 has a gate electrode 31 comprising aluminum, a source electrode 32 and a drain electrode 33 comprising aluminum (Al), and a thin film resistance 35 comprising a material such as luthenium, etc. However, the materials for the respective electrodes are not limited to those mentioned above, but they may also comprise a metal such as Al, Au, Cu, Ag, Cr, W, etc., mixtures of semiconductors such as silicide, etc. with such a metal. The different material chip 41 used in this embodiment had a size of 1 μm square, and as the result of preparation according to the preparation method as described below, a very fine single crystal probe 4 having a tip diameter of 0.1 μm order or less was obtained.

Next, the method for preparing the microprobes shown in FIG. 4 and FIG. 5 are to be described in more detail.

Figure 4A:
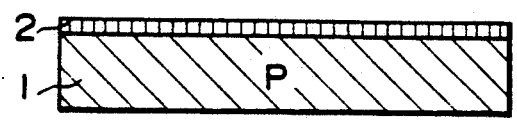
FIGS. 4A–4D and FIGS. 5A–5D are respectively sectional views showing the preparation steps cut along the lines A—A and B—B in FIG. 3.
Figure 5A:
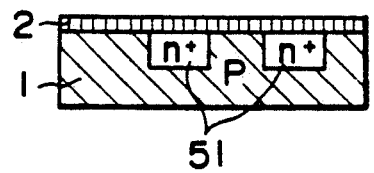
Figure 4B:
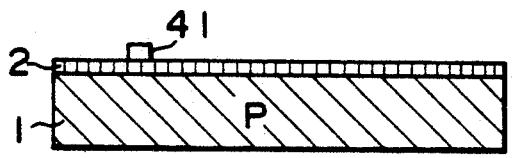
Figure 5B:
Figure 4C:
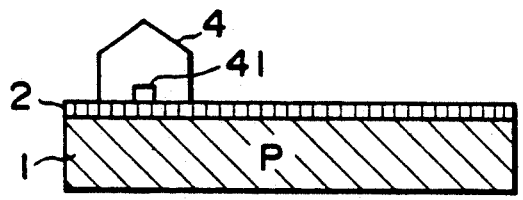
Figure 5C:
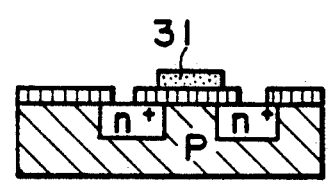
Figure 4D:
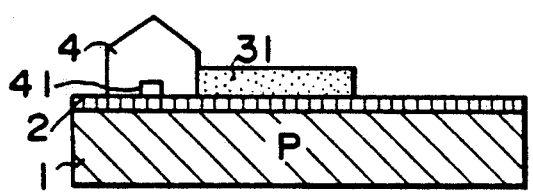
Figure 5D:
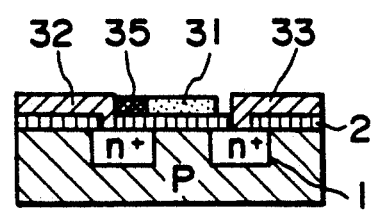

First, as shown in FIG. 4A and FIG. 5A, a p-type silicon semiconductor substrate 1 was prepared, and on its one main surface was formed a silicon oxide (SiO$_2$) film 2. In the region for forming the MOS transistor 34, n$^+$ diffusion layer 51 having antimony (Sb) diffused therein which become respectively source and drain regions is formed. Next, as shown in FIG. 4B, on the silicon oxide film 2 was deposited by the vacuum vapor deposition method, which was then worked by the photolithographic technique to form a different material 41 of 1 μm square. Next, as shown in FIG. 5B, openings are formed in layer 2. Next, the substrate 1 was placed in a reaction furnace heated to 500° C., and the gas mixture of WF$_6$ gas and H$_2$ gas was permitted to flow under reduced pressure of 1 Torr at flow rates of 75 cc/min. and 10 cc/min., respectively. By doing so, since the different material chip 41 comprising silicon has by far greater nucleation density as compared with the silicon oxide film 2, tungsten crystal will grow around the different material chip 41, as the center. At this time, since the different material chip 41 is sufficiently fine to the extent that only a single nucleus can grow, a single nucleus was formed on the different material chip 41, and further the nucleus grew while maintaining the single crystal structure, resulting in formation of a single crystal probe 4 (FIG. 4C). A gate electrode 31 was formed according to the sputtering method (FIG. 4D, FIG. 5C). Next, thin film resistance materials such as aluminum and ruthenium were vapor deposited and worked by use of the photolithographic technique to form the source electrode 32, the drain electrode 33, the thin film resistance 35 of the MOS transistor 34, thus obtaining a microprobe having the MOS transistor 34 for amplification shown in FIG. 3 and FIG. 5D. The above gate electrode 31 may be also made a polycrystalline gate electrode.

Another embodiment is shown below.

Figure 6:
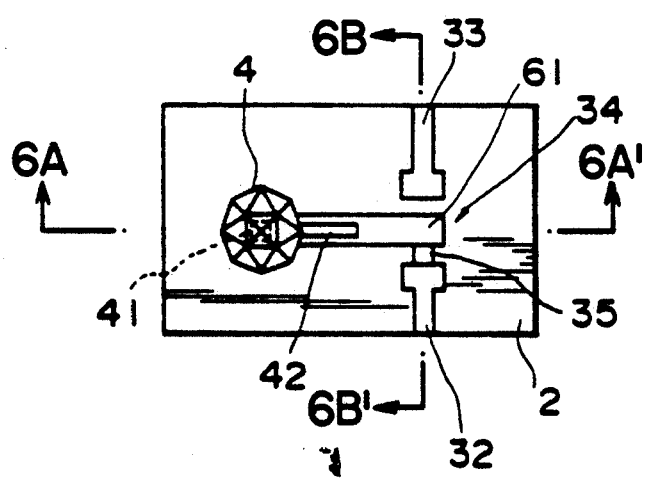
FIG. 6 is a plan view of another embodiment in which the present invention is applied for a current detecting probe.

FIG. 6 through FIG. 8 are drawings for illustration of one embodiment of a microprobe and its preparation of the present invention, FIGS. 7A–7D showing sectional views in the principal preparation steps cut along the line 6A—6A' in FIG. 6, FIGS. 8A–8D sectional view in the principal steps along the line 6B—6B' in FIG. 6, and FIG. 6 a plan view of the completed microprobe.

As shown in FIG. 6, the microprobe of this embodiment has fferent material chips 41 and 42 and a single crystal probe 4 comprising tungsten (W) formed on the basis of the different material chip 41 provided on the silicon oxide (SiO$_2$) film 2 formed on the silicon substrate 1, and further in the vicinity of the single crystal probe 4 is provided the MOS transistor 34 for amplifying the probe current. The MOS transistor 34 has a polycrystalline gate electrode 61 comprising tungsten formed on the basis of the different material chip 42, a source electrode 32 and a drain electrode 33 comprising aluminum (Al), and a thin film resistance 35 comprising a material such as ruthenium, etc. The different material chip 41 used in this embodiment has a size of 1 μm square and, as the result of preparation according to the preparation method as described below, a very fine single probe 4 having a tip diameter of 0.1 m order or less was obtained.

The method for preparing the microprobe in FIG. 6 is to be described.

Figure 7A:
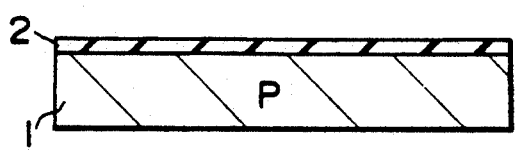
FIGS. 7A–7D and FIGS. 8A–8E are respectively sectional views showing the preparation steps cut along the lines A—A and B—B in FIG. 6.
Figure 7B:
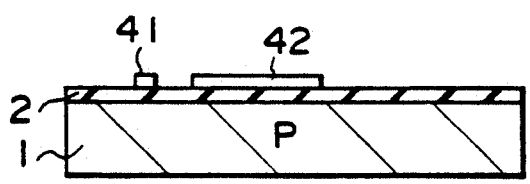
Figure 7C:
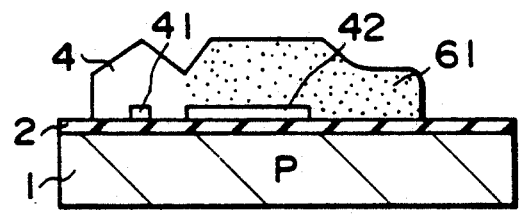
Figure 7D:
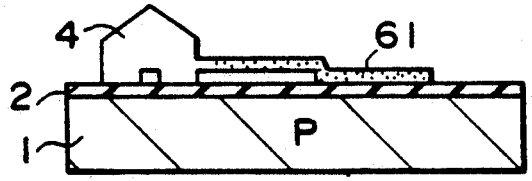
Figure 8A:
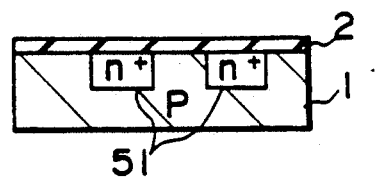
Figure 8B:
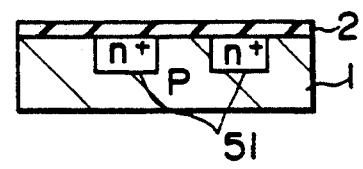
Figure 8C:
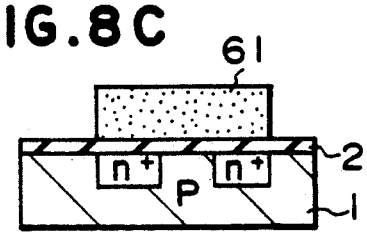
Figure 8D:
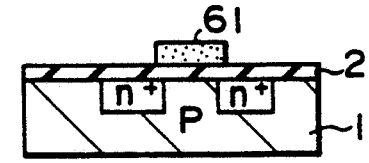
Figure 8E:
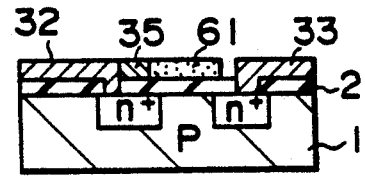

First, as shown in FIG. 7A and FIG. 8A, a p-type silicon semiconductor substrate 1 was prepared, and a silicon oxide (SiO$_2$) film 2 was formed on its one principal surface. In the region for forming the MOS transistor 34, n$^+$ diffused layer 51 having antimony (Sb) diffused therein which functions respectively as the source and drain regions is formed. Next, as shown in FIG. 7B and FIG. 8B, on the silicon. oxide film 2, silicon was deposited by the vacuum vapor deposition method and worked by use of the photolithographic technique to form a different material chip 41 of 1 μm square and a different material chip 42 extending in the longer direction of the substrate 1. The distance between the different material chip 41 and the different material chip 42 was made about 50 μm which was the same as the radius of the single crystal to be formed. Next, the substrate 1 was placed in a reaction furnace heated to 500° C., and a gas mixture of WF$_6$ gas and H$_2$ gas was permitted to flow under a reduced pressure of 1 Torr at the flow rates of 75 cc/min. and 10 cc/min., respectively. By doing so, since the different material chips 41, 42 comprising silicon have by far greater nucleation density as compared with the silicon oxide film 2, tungsten crystals grow around these different material chips 41, 42 as the centers. At this time, since the different material chip 41 is sufficiently fine to the extent that only a single crystal can grow, a single nucleus is formed in the different material chip 41, and further this nucleus grows while maintaining the single crystal structure, resulting in formation of the single crystal probe 4. On the other hand, since the different material chip 42 is not so fine as to permit only single crystal to grow, a polycrystalline gate electrode 61 comprising tungsten was grown on the different material chip 42 (FIG. 7C, FIG. 8C). Next, as shown in FIG. 7D and FIG. 8D, the polycrystalline gate electrode 61 was worked by use of the photolithographic technique to obtain a polycrystalline gate electrode 61 having a predetermined width. Next, thin film resistance materials such as aluminum (Al) and ruthenium were vapor deposited and worked by use of the photolithograhic technique to form the source electrode 32, the drain electrode 33 and the thin film resistance 35 for the MOS transistor, thus obtaining a microprobe having the MOS transistor 34 for initial stage amplification in FIG. 6 and FIG. 8E.

In this embodiment, the single crystal probe 4 comprising tungsten is formed on the silicon oxide film 2 by use of silicon as the different material chip 41, but the material for the single crystal probe is not limited thereto. For example, it is also possible to form a single crystal probe 4 comprising silicon on the silicon oxide film 2 by use of silicon nitride as the different material chip 41, which can be also used for the microprobe.

The probe electrode as described above can be formed in a plural number.

Figure 9:
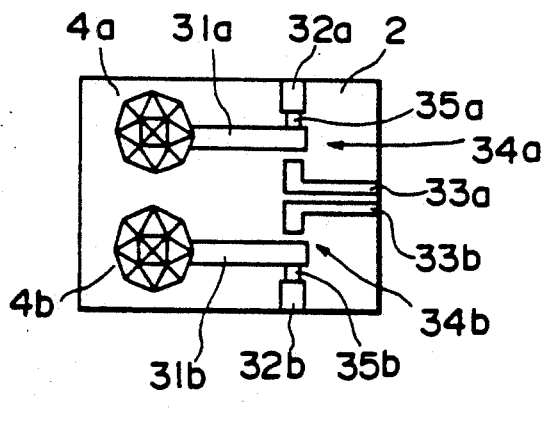
FIG. 9 and FIG. 10 are plan views of the embodiment in which the present invention is applied for a current detecting multi-probe.
Figure 10:
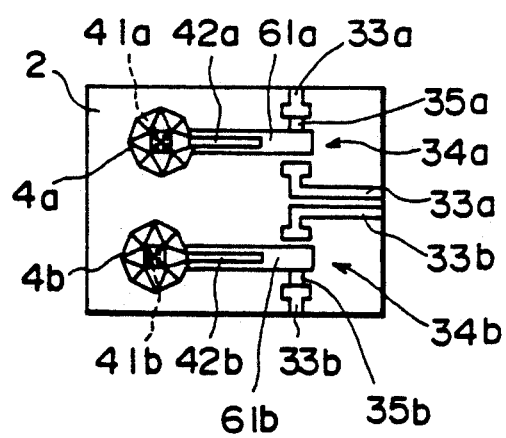

FIG. 9 illustrates schematically the plan view having the multi-probe electrode corresponding to FIG. 3 and FIG. 10 illustrates schematically the plan view having the multi-probe electrode corresponding to FIG. 6. In FIG. 9, the numeral 2 represents a thin film formed on a substrate; 4a and 4b, single crystal probes; 31a and 31b, gate electrodes; 32a and 32b, source electrodes; 33a ad 33b, drain electrodes; 34a and 34b, MOS transistors; 35a and 35b, thin film resistors.

More specifically, as shown in FIG. 10, the micro-multiprobe of this embodiment has different material chips 41a, 41b and 42a, 42b and single crystal probes 4a, 4b comprising tungsten (W) formed on the basis of the different material 41a, 41b provided on the silicon oxide (SiO$_2$) film 2 formed on the silicon substrate, and further in the vicinity of the single crystal probes 4a, 4b are provided MOS transistors 34a, 34b for amplifying the probe current. The MOS transistor 34 has polycrystalline gate electrodes 61a, 61b comprising tungsten formed on the basis of the different material chips 42a, 42b, source electrodes 32a, 32b and drain electrodes 33a, 33b comprising aluminum (Al), and thin film resistances 35a, 35b comprising a material such as ruthenixim, etc.

In this embodiment, for convenience, the size of the different material chip 41 was set at 1 μm square, but it is possible to form a different material chip 41 of up to several μm, or below 1 μm, by working by use of the ultra-fine working technique using X-ray, electron beam, ion beam after deposition of the different material by use of the sputtering method, the CVD method, the vacuum vapor deposition method, etc., and by controlling accurately the process conditions, a fine single probe 4 having a radius of curvature of the tip of a molecular or atomic level can be obtained.

Figure 11:
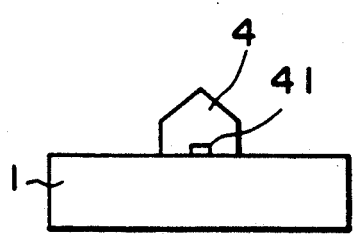
FIG. 11 is a sectional view of another embodiment of the microprobe of the present invention.

FIG. 11 is a sectional view showing the structure of another embodiment of the microprobe of the present invention.

In this embodiment, a different material chip 41 was directly provided on the substrate 1 and a single probe 4 was grown thereon. In this case, it is required that the different material chip 41 selected should have good adhesiveness to the substrate 1 and also have sufficiently greater nucleation density as compared with the substrate 1. Also, when the single crystal probe 4 is to be formed directly on the substrate 1 as in this embodiment, in place of providing the different material chip 41, ions may be injected selectively into a part of the substrate 1 by use of the converged ion beam technique, thereby forming a layer with great nucleation density at that portion.

Figure 12:
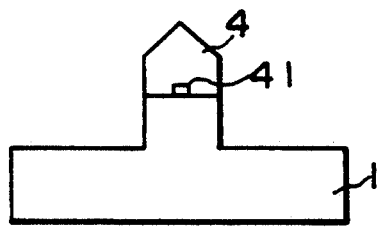
FIG. 12 is a sectional view of still another embodiment of the microprobe of the present invention.

FIG. 12 is a sectional view showing another embodiment of the microprobe of the present invention.

This embodiment has the central part of the substrate 1 protruded, and a single crystal probe 4 is formed on the protruded portion. According to this embodiment, the height of the probe can be controlled by the shape of the substrate 1.

The present invention is not limited to the embodiments as described above, but various modifications may be possible. For example, when a single crystal probe is directly provided on the substrate, the substrate is not limited to a single crystal, provided that the condition of having sufficiently smaller nucleation density as compared with the different material, and a polycrystalline or, amorphous material may be also available. Also, when a single crystal probe is formed on a thin film with sufficiently small nucleation density, the substrate may be either a silicon single crystal wafer or a quartz substrate, or further a substrate of metal, semiconductor, magnetic material, piezoelectric material, insulating material, etc. alay be used. The first stage amplifier is not limited to MOS transistor, but bipolar transistor may be used, and its structure and preparation method can be suitably selected. The first stage amplifier may be previously prepared before formation of the single crystal probe, or alternatively it may be prepared after formation of the single crystal probe. After completion of the crystal growth of the single crystal probe, working may be further applied thereon by way of the electrical field polishing method or the plasma etching method.

Whereas, the single crystal probe 4 shown in FIG. 1 can be also formed according to other methods than the method as shown in FIG. 4 and FIG. 7 as described above.

In the method, an insulating layer having an opening with a part of the single crystal substrate being exposed is provided on a single crystal substrate and, with the above insulating layer as the mask, an apex portion surrounded by the facets having specific plane distances and comprising specific crystal faces is subjected to selective epitaxial growth from the above opening, thereby growing a single crystal.

In the following, the method for crystal growth is to be described.

Its basic principle resides in selective epitaxial growth and epitaxial lateral method growth. Selective epitaxial growth is made to occur on a single crystal substrate (a material with great nucleation factor) by utilizing the difference in factors influencing nucleation under the crystal growth process between the materials such as surface energy, adhesion coefficient, surface diffusion speed, etc.

Thus, by inhibiting generation of stable nucleus on the mask (material with small nucleation factor) (therefore, no crystal occurs from the mask), epitaxial growth is permitted to occur only from the single crystal substrate surface exposed at the opening on the mask.

In the crystal growth method to be used in the present invention, since the mask surface is a non-nucleation surface, generation of such stable nucleus is inhibited and crystal growth occurs selectively only from the single crystal substrate at the mask opening.

Figure 13A:
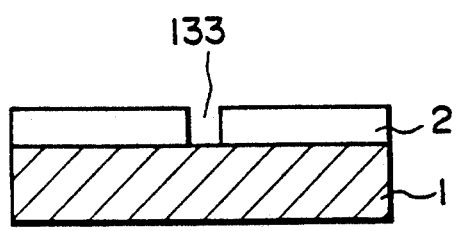
FIGS. 13A–13D are a drawing for illustration of the principle of the crystal formation treatment.
Figure 13B:
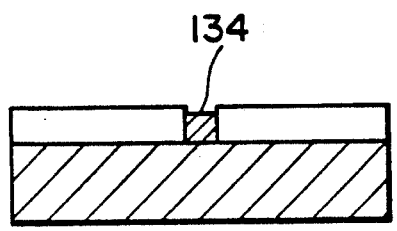
Figure 13C:
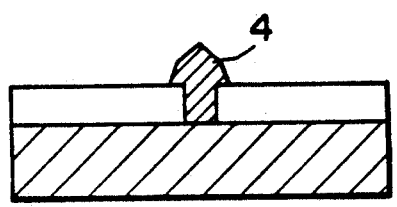

The crystal growth process during that period is described by referring to FIGS. 13A–13D. First, as shown in FIG. 13A, crystal formation treatment is applied on the single crystal substrate 1 of a desired crystal direction provided with an opening 133 to have the surface of the single crystal substrate 1 exposed, by the crystal growth method as described above and under the growth conditions where no stable nucleus of crystal is generated on the surface of the mask 2 (specifically the conditions as shown later in Table 1). The crystal will grow epitaxially only from the single crystal substrate surface at the bottom of the opening 133 to embed gradually the opening 133 (FIG. 13 (b)). Here, the crystal 134 under growth inherits the information concerning crystallinity such as crystal direction, etc. of the single crystal substrate. With the progress of growth, the crystal 134 will at least grow over the mask 2 in the form covering the surface of the mask 2 (overgrowth) to become a single crystal 4 provided with an external form having facets (FIG. 13C). The external form of the single crystal by the facets will grow into a large single crystal 4 as shown in FIG. 13B as accompanied with the increase of surface area of the single crystal 4. The single crystal 4 has the same crystal direction as the single crystal substrate 1, if its material is the same as the substrate single crystal 1, or if it has the same symmetry and approximate lattice constants even though the material is different. Accordingly, even when a plural number of crystals may be formed on the substrate, they will all have the external form of the same crystal direction.

The method for preparing the current detecting shown in FIG. 3 formed by the above method, namely the second method is described by referring to FIG. 14 and FIG. 15.

Figure 14A:
FIGS. 14A–14E and FIGS. 15A–15D are respectively sectional views of other preparation steps cut along the lines A—A and B—B in FIG. 3.
Figure 14B:
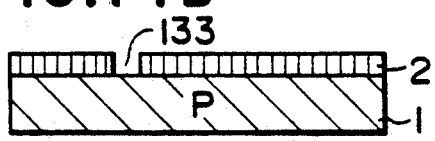
Figure 14C:
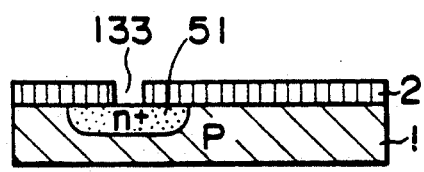
Figure 15A:
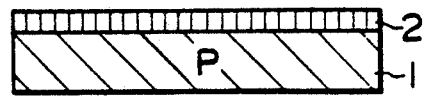
Figure 15B:
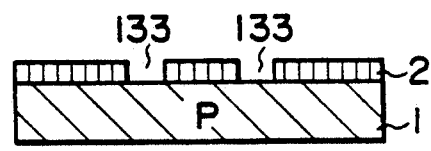
Figure 15C:
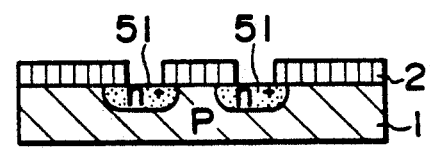

First, on one surface of the p-type silicon single crystal substrate 1 having a plane direction of (100), an insulating film 2 comprising a silicon oxide ($SiO_2$) film with a thickness of about 2000 Å is formed by thermal oxidation (FIG. 14A and FIG. 15A), and then an opening 133 (diameter 1.2 μm) is formed in a matrix with intervals of 50 μm is formed by use of the photolithographic technique (FIG. 14B and FIG. 15B). Next, n+ type region 51 is formed by use of such means as impurity diffusion or ion implantation onto the p-type silicon single crystal substrate 1 (FIG. 14C and FIG. 15C). By this, a p-n junction is formed. Then, the crystal formation treatment was applied on the substrate according to the CVD method under the growth conditions shown below (Table 1).

Table 1
Pressure: 150 Torr
Gases used: $SiH_2Cl_2$ (source gas)+HCl (etching gas)+$H_2$ (carrier gas)
Gas flow rate ratio: $SiH_2Cl_2$: $HCl$:$H_2$ = 1.2:2.4:100
Substrate temperature: 1030° C.
Growth time: 10 min.

Figure 14D:
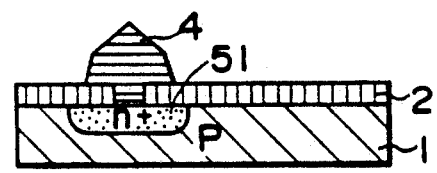
Figure 15D:
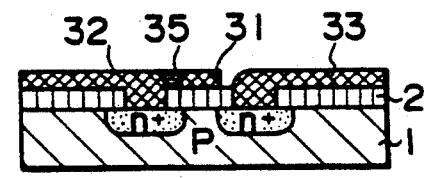
Figure 16:
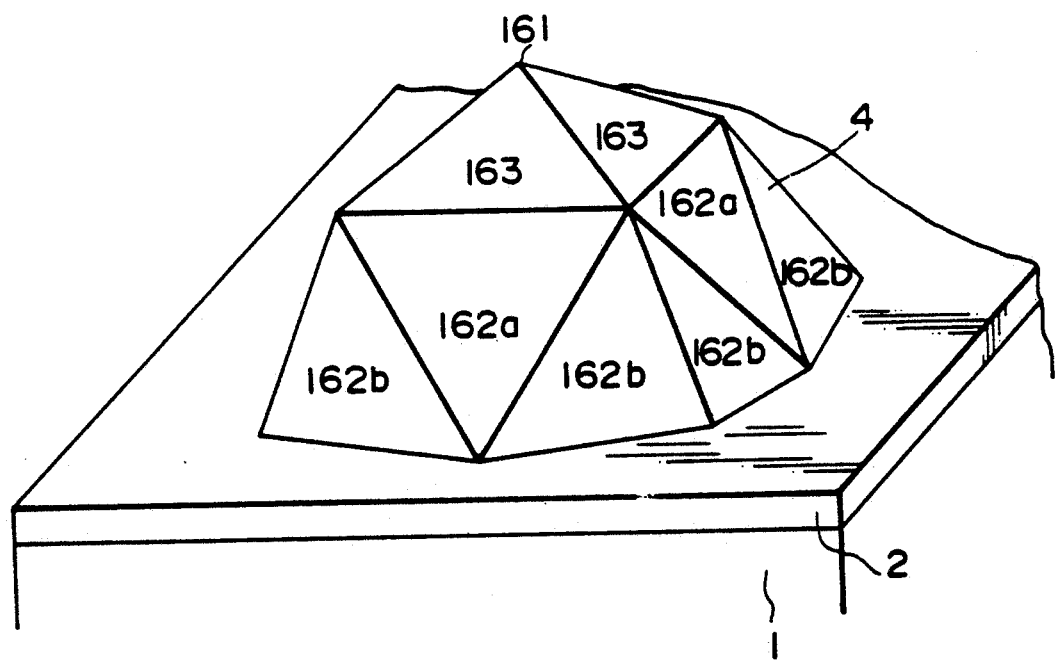
FIG. 16 is a perspective view of the external form by the facet of the Si single crystal having the plane direction of (100)

As the result, a Si single crystal of about 15 μm of grain size having an apex portion surrounded by the facets as shown in FIG. 16 was formed in all of the openings as the center (FIG. 14D). Also, as shown in FIG. 15C, after formation of the p-n junction, the source electrode 32, the thin film resistance 35, the gate electrode 31 and the drain electrode 33 were formed according to the sputtering method to obtain FIG. 15D. For electrode materials, Al, etc. and for thin film resistance, materials such as ruthenium can be used, respectively.

Figure 14E:
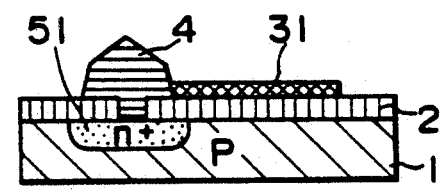

According to these steps, a current detecting microprobe 4 having the MOS transistor 34 for first stage amplification of the detected current as shown in FIG. 3, FIG. 14E, FIG. 15D could be prepared.

When the present invention is applied for the current detecting probe, the above embodiment is not limitative, but, for example, the single crystal substrate may be also a substrate of a metal, a magnetic material, a piezoelectric material, an insulating material etc. The electrode materials, the insulating films, the thin film resistance in the present invention are not limited to this embodiment.

The method for crystal formation treatment, include, for example, the CVD method, the LPE method, the MOCVD method, etc., but of course other methods than these may be employed.

The material for crystal growth may be either the same as or different from the material of the single crystal substrate. For example, when the single crystal substrate is made Ge, the material for crystal growth can be made Ge, Si, GaAs, GaAlAs or other compound semiconductors. Also, similarly when the single crystal substrate is Si, the material for crystal growth can be made Ge, Si, GaAs, GaAlAs and other compound semiconductors.

The facets and the apex portion of the single crystal probe obtained by the method as shown in FIG. 4 or FIG. 14 are to be described.

The single crystal as described above takes a growth form surrounded by facets comprising specific crystal faces due to anisotropy in growth speed. Although the crystal faces forming the facets are generally faces with slow growth speed, the growth speed is sensitive to the change in environmental phase during growth and its anisotropy is also great, and consequently the growth form of the single crystal depends on the growth method and the growth conditions. Accordingly, if a single crystal substrate having a suitable plane direction corresponding to the crystal to be grown is selected, a mask is formed thereon and a crystal formation treatment is applied thereon by selecting suitable growth method and suitable growth conditions, a single crystal having an apex portion surrounded by facets can be obtained. FIG. 16 is a perspective view of the single crystal thus formed. The single crystal has each facets comprising four (111) faces 162a, eight faces 162b and high dimensional crystal faces 163 between the (311) and (411), and forms an apex portion 161 by the 4 triangular faces 163. Since the facet face 163 is a crystallographical crystal face, the top of the apex portion 161 is provided in principle with a sharpness of atomic level. The microprobe of the present invention has such stable structure and the improvement of its performance is obtained by forming the single crystal having a sharp apex portion at a desired position with good controllability.

By varying the growth conditions, the single crystal can be grown to an external form by the facets with the apex portion being surrounded by the (111) faces.

Figure 17:
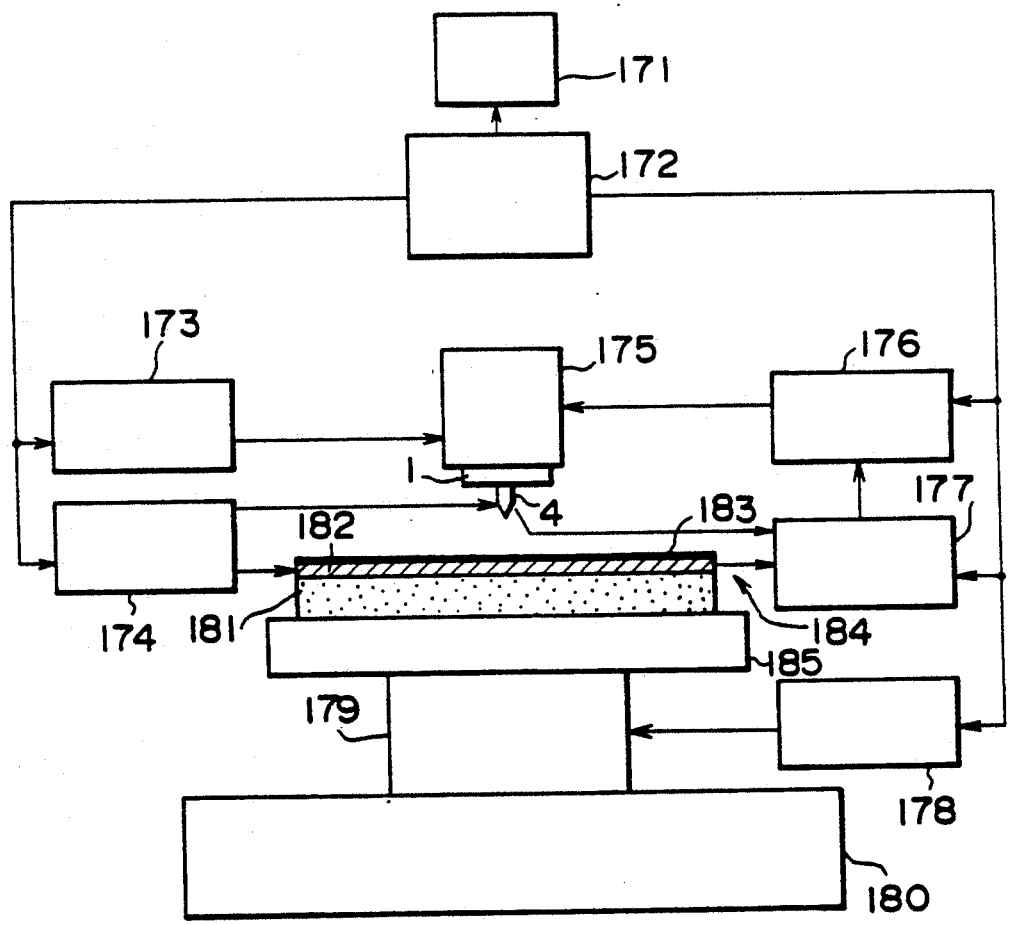
FIG. 17 is a schematic diagram of the recording-reproducing device by use of the microprobe of the present invention.

FIG. 17 is a block diagram showing the constitution of an example of a high density recording-reproducing device by use of the microprobe of the present invention.

The high density recording-reproducing device writes the data by forming selectively low resistance portion (ON state) by applying a writing voltage between the both ends of the recording layer which has become the high resistance state (OFF state) under the initial state, and performs reproduction of the data by detecting the tunnel current from the probe by applying a voltage smaller than the switching threshold voltage during reproduction.

In such high density recording-reproducing device, the recording medium 184 comprises a substrate 181, a substrate electrode 182 and a recording layer 183, and is placed and fixed on a pedestal portion 185. The coarse adjustment mechanism 179 is provided for coarse adjustment control of the position in the vertical direction of the recording medium 184 in order to maintain the distance between the recording medium 184 and the single crystal probe 4 at a certain value, and is driven by the coarse adjustment driving circuit 178. Below the coarse adjustment mechanism is further provided an XY state 180, which can move the position of the recording medium 184 in the XY direction. The pulse power source 174 is provided for applying pulse voltage for recording/crazing between the single crystal probe electrode 4 and the substrate electrode 182. The probe current amplifier 177 amplifies the probe current at the single crystal probe 4 to deliver it to the servo circuit 176, and the servo circuit 176 controls movement in the vertical direction of the fine adjustment control mechanism 175 so that the current from the probe current amplifier 177 may become a desired value. The fine adjustment mechanism 175 is controlled in movement in the XY direction by the XY scanning driving circuit 173. Each circuit is controlled comprehensively by a microcomputer 172, and the processing information in the microcomputer 172 is displayed on the displaying device 171.

By use of the device as described above, with the distance between the probe 4 and the recording layer 183 maintained constant (nX order) by controlling the fine adjustment control mechanism 175, and moving the XY stage 180, recording was performed by applying a recording pulse voltage on the recording layer 183, and thereafter reproduction was effected. As the result, recording-reproducing resolution power of 1 μm could be obtained. Thus, it has been clarified that the single crystal microprobe 4 prepared by the above method has very fine tip diameter, and is suitable for pracitcal use.

Since the microprobe 4 has a MOS transistor 34 for initial stage amplification on the substrate, a prove current greater by 2 digits as compared with the probe current obtained from conventional probe can be obtained to improve the S/N ratio.

Figure 18:
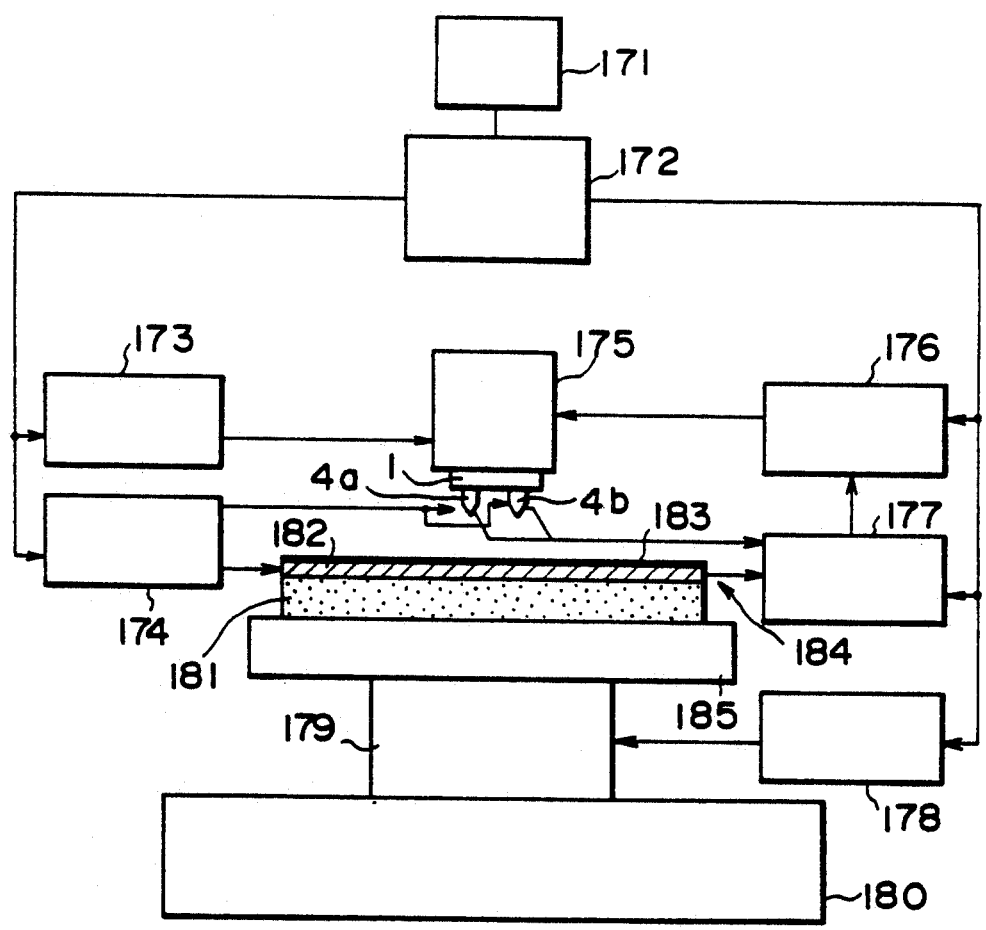
FIG. 18 is a block diagram showing an example of the high density recording-reproducing device by use of the micro-multiprobe of the present invention.

FIG. 18 is a block diagram showing the constitution of an example of the high density recording-reproducing device when the probe shown in FIG. 17 is used multiwise.

In the high density recording-reproducing device having the multi-probe, the two probes 4a, 4b can perform recording and reproduction independently.

The high density recording medium 184 as mentioned above can be made of a materials having memory-switching phenomenon (electric memory effect) in the current-voltage characteristic.

For example, there may be included:

(1) amorphous semiconductors such as oxide glass, borate glass or chalcogenide glass containing Se, Te, As compounds with the element of the periodic table of the group III, IV, V or VI, etc. They are intrinsic semiconductors having an optical band gap Eg of 0.6 to 1.4 eV or an electrical activation energy ΔE of about 0.7 to 1.6 eV. Specific examples of chalcogenide glass may include As-Se-Te system, Ge-As-Se system, Si-Ge-As-Te system, for example $Si_{16}Ge_{14}As_5Te_{65}$ (suffix means atomic%), or Ge-Te-X system, Si-Te-X system (X=small amount of V, VI group element), for example $Ge_{15}Te_{81}Sb_2S_2$.

Further, Ge-Sb-Se system chalcogenide glass can be also used.

In the amorphous semiconductor layer having the above compound deposited on the electrode, the electrical memory effect of the medium can be exhibited by applying a voltage by use of the probe electrode in the direction vertical to the film surface.

As the method for depositing such material, the object of the present invention can be accomplished according to the thin film forming technique known in the art. For example, as a preferable film forming method, the vacuum vapor deposition method or the cluster ion beam method may be employed. Generally speaking, the electric memory effect of such material is observed at a film thickness of several μm or less, and although the film may be preferably thinner concerning the recording resolving power as the recording medium, a film with a thickness of 100 Å to 1 μm is preferred from the standpoint of uniformity, recording characteristic, more preferably 1000 Å or less.

(2) Further, there can be also included organic semiconductor layers prepared by depositing, on an electrode, a salt of a metal having relatively lower reduction potential such as copper or silver with an electron accepting compound such as tetraquinodimethane (TCNQ), TCNQ derivatives, for example tetrafluorotetracyanoquinodimethane (TCNQF$_4$), tetracyancethylene (TCNE) and tetracyanonaphthoquinodimethane (TNAP), etc.

As the method for forming such organic semiconductor layer, there may be employed the method in which the above electron accepting compound is vacuum vapor deposited on the electrode of copper or silver.

The electric memory effect of such organic semiconductor is observed for those with a film thickness of some 10 μm or less, but those with a film thickness of 100 Å to 1 μm are preferred from the standpoint of film forming property and uniformity.

(3) Further, a recording medium comprising amorphous silicon as the material can be employed. For example, it may be a recording medium having a layer constitution of metal/A-Si (p+ layer/n layer/i layer) or metal/A-Si (n+ layer/p layer/i layer). Deposition of the respective layers of A-Si can be sufficiently performed according to the known methods in the art. In the present invention, the grow discharge method (GD) may be preferably employed. The film thickness of A-Si may be preferably 2000 Å to 8000 Å for the n layer, about 1000 Å for the p+ layer and the whole thickness preferably about 0.5 μm to 1 μm.

(4) Further, there may be also included a recording medium comprising a molecule having in combination a group having r electron level and a group having only (i electron level laminated on the electrode.

As the structure of dye having suitable π electron system for the present invention, there may be included, for example, dyes having porphyrine skeleton such as phthalocyanine, tetraphenylporphyrine, etc., azulene type dyes having squarilium group and croconic methine group as the binding group, cyanine analogue type dyes having two hetero-atom containing heterocyclic rings such as quinoline, beniothiazole, benzoxazole, etc. bound with squarilium group and croconic methine group, cyanine dyes fused polycyclic aromatic such as anthracene and pyrene, chain compounds formed by polymerization of aromatic or heterocyclic ring compounds, polymers of diacetylene groups, tetraquinodimethane or tetrathiafluvalene derivatives, analogues thereof and charge transfer complexes thereof, and further metal complex compounds such as ferrocene, trisbipyridyl ruthenium complex, etc.

Concerning formation of an organic recording medium, although application of the vacuum vapor deposition method or the cluster ion beam method may be possible as a specific example, it is extremely preferable to use the LB method of the techniques of the prior art from controllability, easiness and reproducibility.

According to the LB method, a monomolecular film of an organic compound having hydrophobic site and hydrophilic site in one molecule or a built-up film thereof can be easily formed on a substrate, and an organic ultra-thin film which is uniform and homogeneous over a large area can be stably supplied.

The LB method is a method to prepare a monomolecular film or a built-up film thereof by utilizing the fact that, in a molecule with a structure having hydrophilic site and hydrophobic site within a molecule, when balance between the both (amphiphilic balance) is adequately maintained, the molecules form a monomolecular layer on the water surface with the hydrophilic groups directed downward.

As the group constituting the hydrophobic site, there may be included various hydrophobic groups generally known widely such as saturated and unsaturated hydrocarbon groups or fused polycyclic aromatic groups and chain polycyclic phenyl groups, etc. These constitute the hydrophobic portion either individually or as a combination of a plurality thereof. On the other hand, as the most representative of the constituent of the hydrophilic group, there may be included hydrophilic groups such as carboxyl group, ester group, acid amide group, imide group, hydroxyl group, further amino groups (primary, secondary, tertiary and quaternary), etc. These also individually or in combination constitute the hydrophilic portion of the above molecule.

A dye molecule having these hydrophilic and hydrophobic groups with good balance, and a π electron system having adequate size can form a monomolecular film on the water surface to be an extremely suitable material for the present invention.

Specific examples may include the molecules as shown below:

[I] Croconic methine dyes:

1)
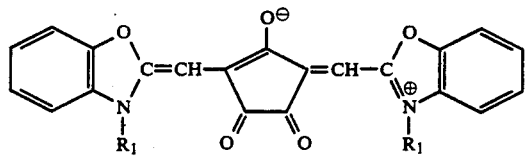

2)
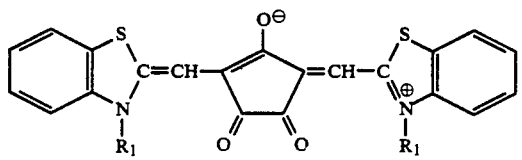

3)
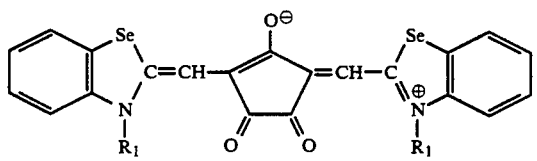

4)
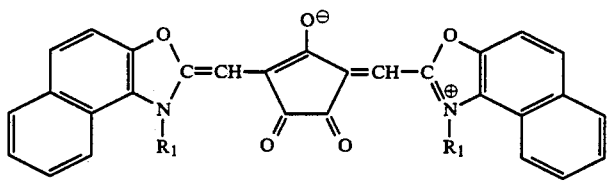

5)
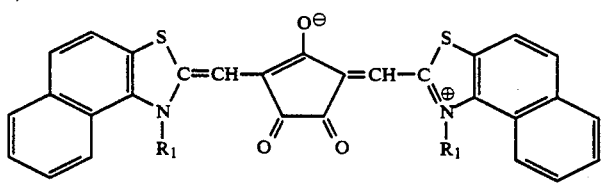

6)
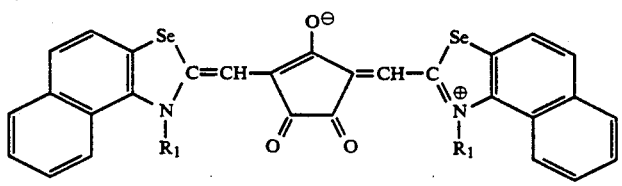

7)
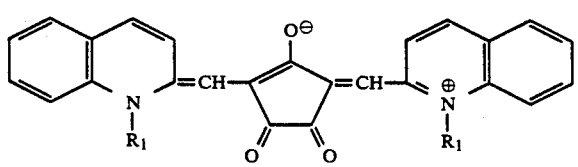

8)

[I] Croconic methine dyes:

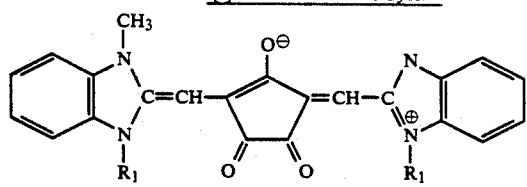

9)

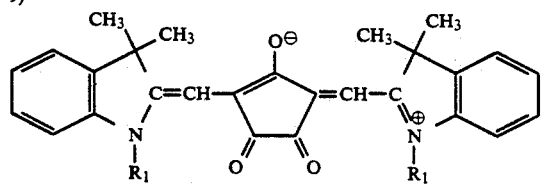

10)

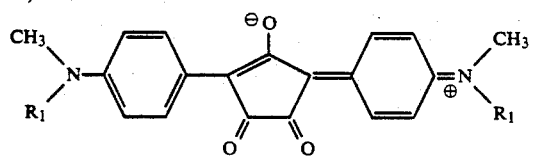

11)

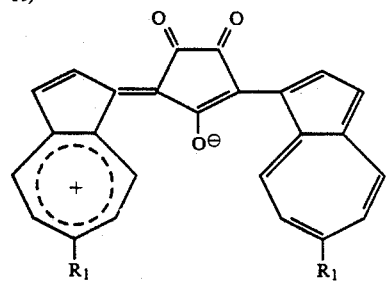

Here, $R_1$ corresponds to the group having the electron level as mentioned above, and is a long chain alkyl group introduced for making formation of monomolecular film on the water surface easier, with its carbon number n being preferably $5 < n < 30$.

The compounds set forth above as specific examples show only basic structures, and various substituted derivatives of these compounds can be also suitably employed in the present invention as a matter of course.

[II] Squarilium dyes:

The compounds set forth in (I) in which the croconic methine group is replaced with squarilium group having the following structure:

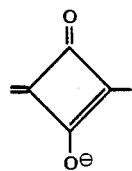

[III] Porphyrine type dye compounds:

-continued

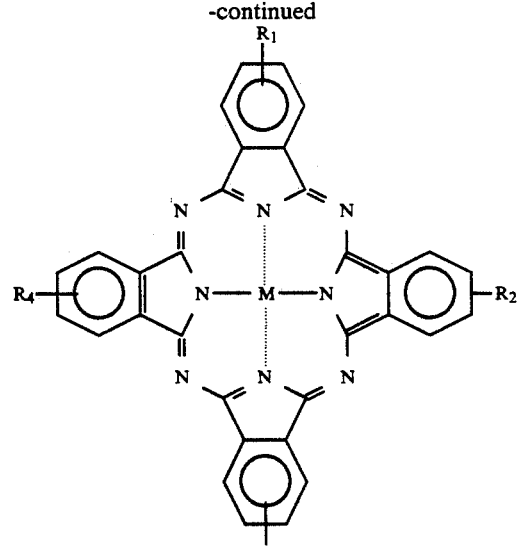

$R_1, R_2, R_3, R_4 = H$, —O—⌬

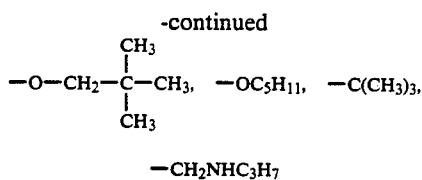

$M = H_2$, Cu, Ni, Al-Cl, $SiCl_2$ and rare earth metal ion.

2)

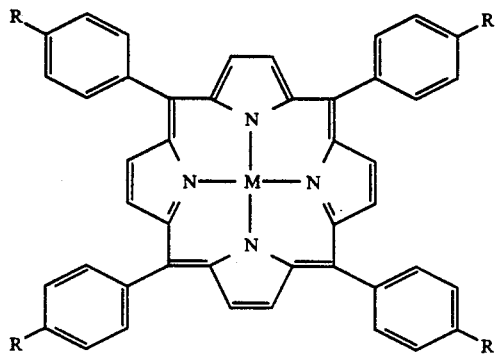

$R = OCH(COOH)C_nH_{2n+1}$  $5 \leq n \leq 25$  $M = H_2$, Cu, Ni, Zn, Al-Cl, $SiCl_2$ and rare earth metal ion.

3)

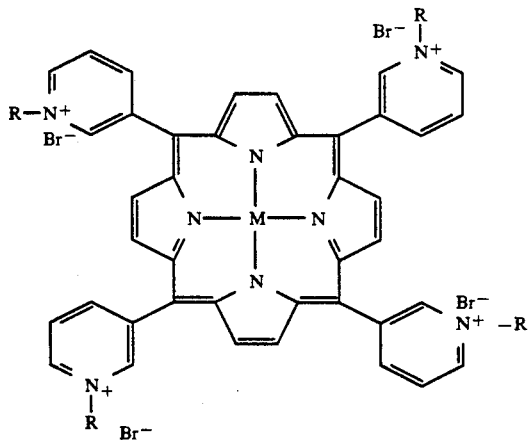

$R = C_nH_{2n+1}$  $5 \leq n \leq 25$  $M = H_2$, Cu, Ni, Zn, Al-Cl, $SiCl_2$ and rare earth metal ion.

R is introduced for making formation of monomolecular film easier, and is not limited to the substituents mentioned here. $R_1$–$R_4$, and R correspond to the group having the $\sigma$ electron level as mentioned above.

[IV] Fused polycyclic aromatic compounds:

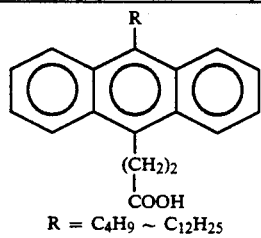

$R = C_4H_9 \sim C_{12}H_{25}$

[IV] Fused polycyclic aromatic compounds:

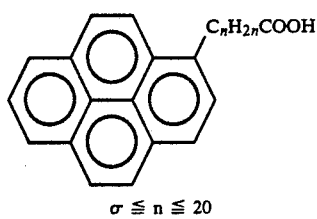

$\sigma \leq n \leq 20$

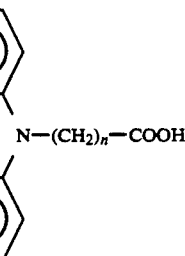

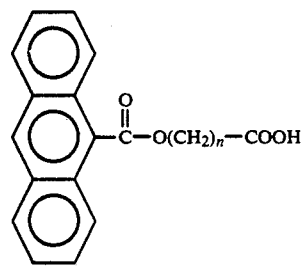

[V] Diacetylene compound:

$0 \leq n, m \leq 20$ but $n + m > 10$

X is a hydrophilic group, and generally —COOH is used, but also —OH, —$CONH_2$ can be used.

[VI] Others:

1)

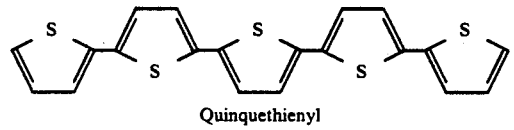

Quinquethienyl

2)

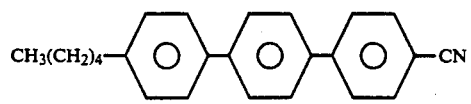

3)

-continued
[VI] Others:

4)
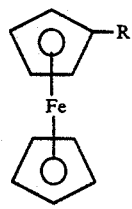

R = CONHC$_{18}$H$_{37}$,
OCOC$_{17}$H$_{35}$

5)
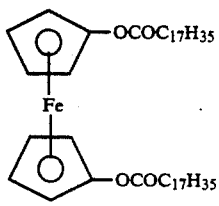

6)
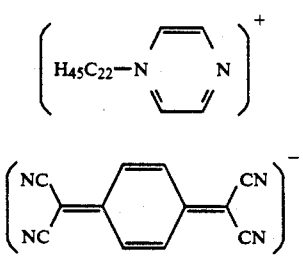

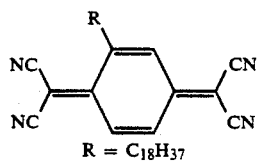

R = C$_{18}$H$_{37}$

Other than those mentioned above, dye materials suitable for the LB method are suitable for the present invention. For example, biological materials (e.g. bacteriorhodopsin or Cytochrome C) of which studies have been recently abundantly done or synthetic polypeptides (PBLG, etc.) are also applicable.

Although the electric memory effect of the compounds having the π electron level has ben observed for those with a thickness of tens of μm or less, but a film thickness of 15 to 2000 Å is preferred from the standpoint of film forming property and uniformity.

As the substrate for supporting the material having the electric memory effect as mentioned in the above items 8 (1) to (4), it is required to have the character as an electrode, but a conductor having a conductivity of 10$^{-6}$ (ohm/cm) is all available. More specifically, there may be included a large number materials, including metal plates of Au, Pt, Pd, Ag, Al, In, Sn, Pb, W, etc. or alloys of these, or glass, ceramics, plastic materials having these metals or alloys vapor deposited thereon, or Si (crystalline, amorphous) or graphite and further electroconductive oxides such as ITO.

More specifically, in the present invention on a glass substrate 181 was formed a substrate electrode 182 comprising gold (Au), on which was further formed an LB film of squarilium-bis-6-octylazulene (hereinafter abbreviated as SOAZ) as the recording layer 183. The LB film of SOAZ was formed as described below.

First, after the glass substrate (substrate 181) was washed with a neutral detergent and trichloroethylene, chromium (Cr) was deposited thereon as the subbing layer to a thickness of 50 Å according to the vacuum vapor desposition method, and further gold (Au) was vapor deposited to 400 Å according to the same method to form a substrate electrode 182.

Next, a chloroform solution containing SOAZ at a concentration of 0.2 mg/ml dissolved therein was spread on an aqueous phase of 20° C. and a monomolecular film was formed on the water surface. After evaporation of the solvent, the surface pressure of such monomolecular film was enhanced to 20 mN/a, and further while maintaining this pressure constantly, the above electrode substrate was dipped at a speed of 5 mm/min. so as to transverse the water surface, and further withdrawn to build up two-layer Y-type monomolecular films. By repeating this operation for 4 times, 8 layers of built-up films were formed on the substrate 181 to prepare an LB film of SOAZ.

Figure 19:
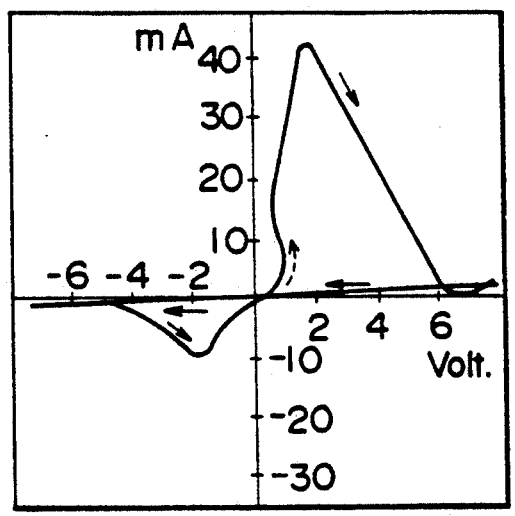
FIG. 19 and FIG. 20 are respectively characteristic charts showing the voltage-current characteristics of the recording medium 184 in FIG. 17 and FIG. 18.
Figure 20:
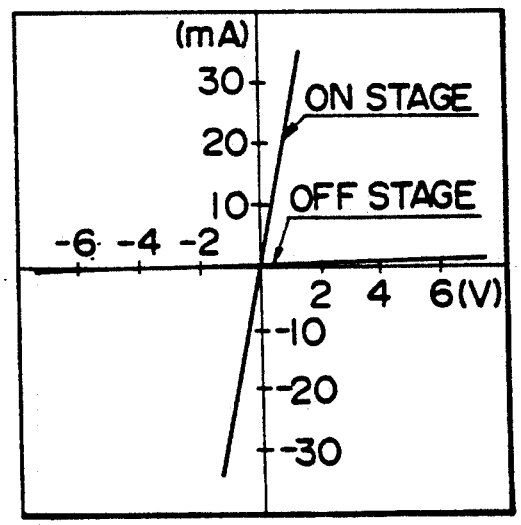

The device of the MIM structure by use of the LB film as the insulator exhibits the current-voltage characteristics as shown in FIG. 19 and FIG. 20, having the memory-switching characteristic. More specifically, as shown in FIG. 17 and FIG. 18, the recording current can be passed through the recording layer 183 by the current applied between the substrate electrode 182 and the probes 4a, 4b, whereby the high resistance state (OFF state) at the initial state can be changed to the low resistance state (ON state). As shown in FIG. 20, when under the OFF state, substantially no probe current will flow even when the probe voltage may be applied during reproduction, while under the ON state, the probe current changing linearlly at around −1 V to 1 V will flow. From this fact, ON/OFF of the recording layer 183 can be detected.

Other embodiments are shown below.

Figure 21:
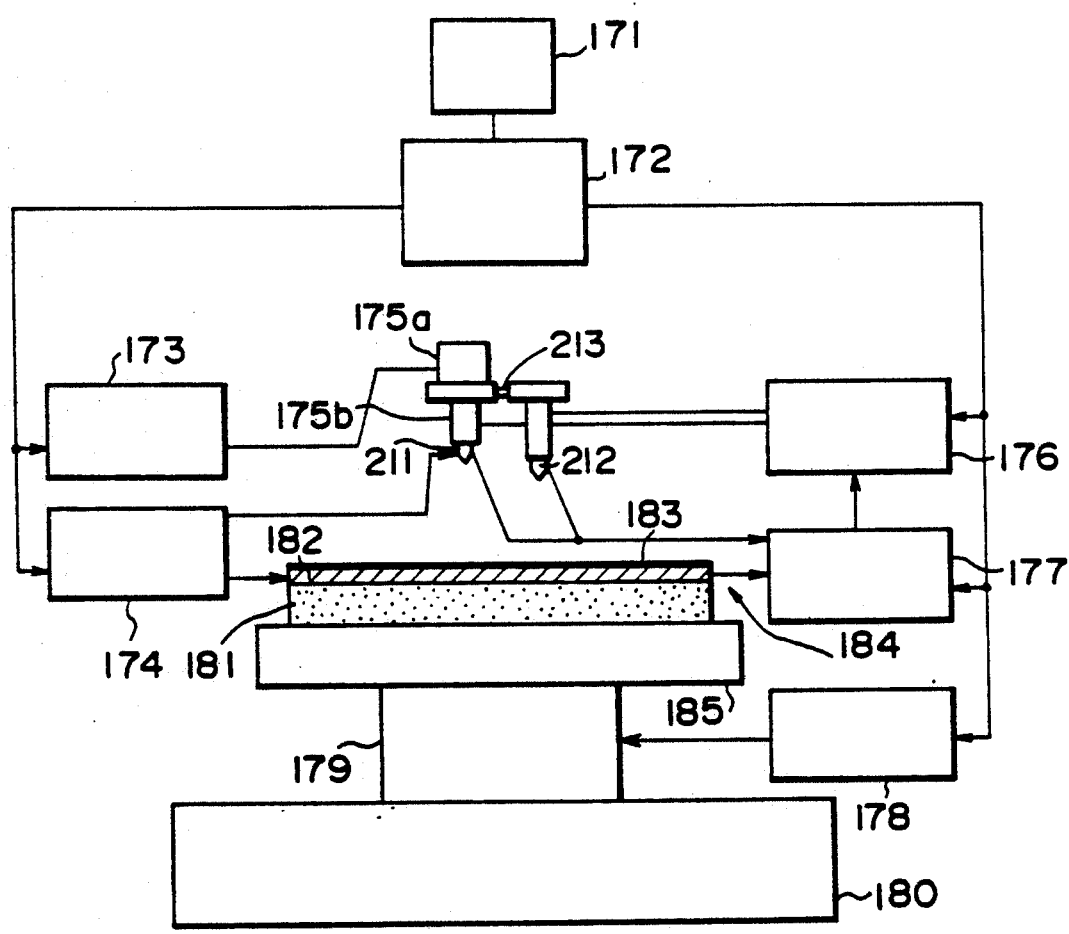
FIG. 21 is a block diagram showing illustratively the recording-reproducing device.

In FIG. 21, two probe electrodes shown by 4a, 4b in FIG. 18 are utilized separately for positional detection and for recording-reproduction.

In the following, the respective constitutions in FIG. 21 are explained in items by (1) to (4).

(1) Constitution of recording-reproducing device

In FIG. 21, the numeral 211 and 212 denote probe electrodes to be used for recording-reproduction and positional detection, respectively, and the distance between these two probe electrodes can be minutely controlled by the minute control mechanism 213 between the prove electrodes by use of a piezoelectric device, but generally maintained at a constant interval, 177 is a probe current amplifier, and 176 is a servo circuit for controlling the fine adjustment mechanisms 175a, 175b by use of piezoelectric devices so that the probe current may become constant. 174 is a pulse power source for applying pulse voltage between the probe electrode 211 for recording and reproduction and the substrate electrode 182.

Since the probe current is abruptly changed when a pulse voltage is applied, the servo circuit 176 controls the HOLD circuit so as to be ON so that the output voltage may become constant during application of the voltage.

173 is XY scanning driving circuit for moving a pair of probe electrodes 211, 212 in the XY direction. 178 and 179 are used for coarse adjustment control of the distance between the probe electrodes 211, 212, and the recording medium 184 so that a probe current of about $10^{-9}$ A may be obtained, or for taking a great relative displacement in the XY direction between the probe electrode and the substrate (outside of the fine adjustment control mechanism).

These respective instruments are all subject to the central control by means of a microcomputer 172. 171 represents a display instrument.

The mechanical performances in movement control by use of piezoelectric device are shown below.

Z-direction fine -adjustment control range: 0.1 nm-1 $\mu$m

Z-direction coarse adjustment control range: 10 nm-10 mm

XY-direction scanning range: 0.1 nm-1 $\mu$m

XY-direction coarse adjustment control range: 10 nm-10 mm

Measurement, control tolerance: <0.1 nm (at fine adjustment)

Measurement, control tolerance: <1 nm (at coarse adjustment)

(2) Positional detection system

When the redius of curvature of the tip of probe electrode becomes small to enable high density recording, such high density recording depends greatly on the scanning precision of the probe electrode in the direction within the recording plane (X-Y direction) as well as the positional control precision. Here, recording and reproduction are performed at the position of the recording medium corresponding to the positional coordinate which becomes the standard.

The positional detection method of the present invention utilizes the fact that tunnel current will flow when the electroconductive probe (probe electrode) and an electroconductive substance are made to approach to a distance of about 1 nm while applying voltage therebetween, similarly as in recording and reproduction of information. Since tunnel current depends on the work function on the conductor surface, informations about various surface electron states can be read. By utilizing this, regular atomic arrangement, or such regular atomic arrangement for a recording medium having an original point which becomes the standard formed as desired, or a positional coordinate system based on the standard original point is introduced to perform positional detection by detecting the characteristic change in tunnel current corresponding to such positional coordinate system, and at the same time recording or reproduction position on the recording medium exhibiting the relative positional relationship to such positional coordinate system are specified based on such positional detection result, simultaneously with positional control of the probe electrode on such recording and reproduction position.

Figure 22:
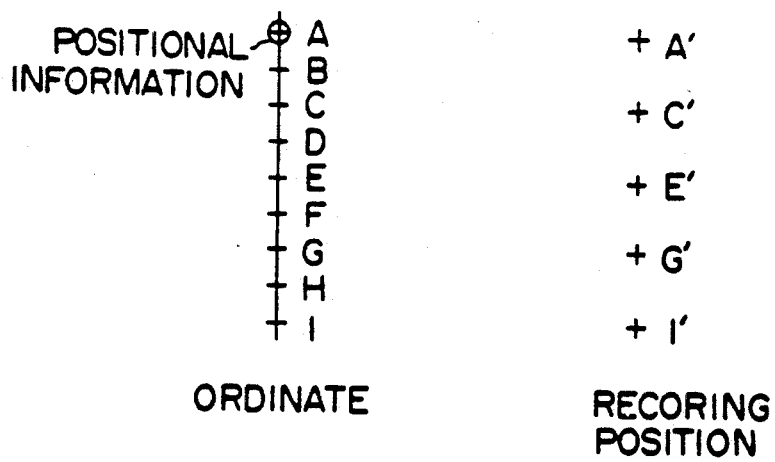
FIG. 22 is a principle diagram showing the positional relationship between the coordinate axis of the present invention and the recording position.

FIG. 22 shows a schematic illustration of the positional relationship between the coordinate axis and the recording position. Thus, the position information (A-I) as the scale on the coordinate axis is always given by relative positional relationship (A-A', etc.) with the recording positions (A'-I'). Accordingly, by detecting the positional informations A-I, the recording positions of A'-I' can be necessarily specified. In this case, the respective points (scale) on the coordinate axis are not necessarily required to take one single arrangement relative to the recording positions (for example, there are a plural number of recording positions corresponding to the positional information A exist, such as A'', A''', In addition to A'), but a single correspondence (1:1 correspondence) is preferred for precision. Also, the coordinate axis is not required to be one, but a plurality thereof may be used, and also it is not required to be one-dimensional but also two-dimensional (in network). In this case, corresponding to the respective lattice points in the two-dimensional coordinate system, the recording positions are also arranged two-dimensionally.

(3) Coordinate axis

The coordinate axis as the positional detection system to be used in the present invention is formed by use of a regular atomic arrangement and/or the standard point formed as desired. As such regular atomic arrangement, an electroconductive material of which the distance between lattices is known, namely various metals or graphite single crystals, etc. can be utilized. In addition, since the tunnel current utilized in the present invention is as great as about nA, the above electroconductive material may have an electrical field ratio of $10^{-10}$ ($\Omega$ cm$^{-1}$) or higher, and therefore a single crystal of a semiconductor such as silicon, etc. can be also used. Among them, as a typical example is considered a metal sample. Now, if a voltage V lower than the work function $\phi$ is applied between the probe electrode and the above sample with a distance Z apart from each other, the electrons are known to tunnel the potential barrier. The tunnel current density $J_T$ can be determined by free electron approximation, being represented as follows:

$$J_T = (\beta V/2\pi\lambda z)exp(-2Z/\lambda) \qquad (1)$$

wherein $\lambda = h/\sqrt{2m\phi}$: attenuation distance of wave function in vacuum or in air outside metal $h = r/2\pi$:r: Planck constant, m: mass of electron $\beta = e^2/h$:e: represents electron charge.

In the formula (1), if Z is a constant value as Z=Zc, the tunnel current density $J_T$ will vary corresponding to the work function $\phi$ of the standard atomic arrangement. Accordingly, by scanning the probe electrode on such metal material surface in any desired linear direction while maintaining Z=Zc, the tunnel current will vary periodically according to the metal atomic arrangement. Here, when a metal sample with a known lattice constant is used, the state of atomic arrangement in any desired direction with a certain lattice point on any desired crystal face is self-explanatory, and the periodical change in tunnel current obtained can be sufficiently predicted for the case of scanning the probe electrode in such direction. Accordingly, if the scanning direction of the probe electrode is corrected so that the predicted value of such tunnel current change and the measured value of the tunnel current change obtained by practically scanning the probe electrode may take the equal value, the probe electrode will move along the atomic arrangement of the sample. Thus, if the atomic arrangement is regarded as the coordinate axis, the probe electrode will move on the coordinate axis. Now, suppose that the probe electrode on the coordinate axis can be moved in a certain direction to a position with a certain distance apart therefrom and the destination of movement is a region capable of recording and reproduction, and then recording and reproduction become possible at the positions corresponding at 1:1 to the respective points on the coordinate axis. In this case, the probe electrode is not necessarily moved between the coordinate axis and the recording region. For example, there may be also employed the method in which a recording-reproduction probe electrode is prepared at a certain position relative to the probe electrode (probe electrode for detection of position) moving on the coordinate axis, and both of the electroded are subjected to movement.

Anyway, the position of the probe electrode in the recording region, namely the recording position can be determined corresponding singly to the coordinate axis utilizing the crystal lattice of the metal sample.

As described above, when a part or all of the recording medium surface has a regular atomic arrangement, and its arranged state is known, it is possible to set a recording region having an X-Y coordinate system exhibiting a relative relationship corresponding singly to the coordinate axis utilizing the crystal lattice of such atomic arrangement.

As the cooridnate axis for positional detection, otherwise it is also possible to prepare unevenness on the sample surface, injecting ions of other atoms, etc., thereby making a plural number of points which become the standards artificially to make these the positional coordinate. However, they are inferior in precision of the coordinate axis as compared with those utilizing the above atomic arrangement.

Having shown that recording and reproduction are possible at the respective points corresponding to the positional coordinate simultaneously setting of the positional coordinate on the recording medium, it is necessary to make clear the initiating point in practical recording and reproduction. That is, it is necessary to provide an original point which becomes the standard on the coordinate axis. The standard original point can be also introduced by providing unevenness by the method such as etching on the coordinate axis, or by effecting ion injection, etc. to modify the surface state of the recording medium, but as already mentioned, it lacks the precision in order to be used as the original point of the coordinate axis by use of the atomic arrangement. Now, when the point A on the coordinate axis is chosen as the standard original point in FIG. 22, to discriminate the point A and to discriminate the point A' on the recording region which is in relative positional relationship corresponding singly to the point A are the same thing. In other words, if the point A' can be discrimianted, the coordinate axis and the positions of the respective points on the coordinate axis are determined individually singly. As the method for setting the standard original at the point A', it is excellent in precision and also in the point of easy preparation to input the information as the original point at the point A' according to the same method as the writing method for recording. Such standard original point need not be limited to one point, but a plural number of such points may be also formed, if desired.

The recording medium of the present invention is constituted of a combination of the electric memory material as described above and its supporting substrate (electrode), and when atomic arrangement is used as the coordinate axis, the atomic arrangement of such electric memory material itself is frequently inferior in its regularity and not preferably utilized as the coordinate axis. Accordingly, it is desirable to use a material having regular atomic arrangement such as a metal, a crystalline Si, graphite, etc. as the substrate and then, by making a part thereof undeposited with the electric memory material, utilize the substrate atomic arrangement at such site as the coordinate axis.

(4) Recording medium

Figure 23A:
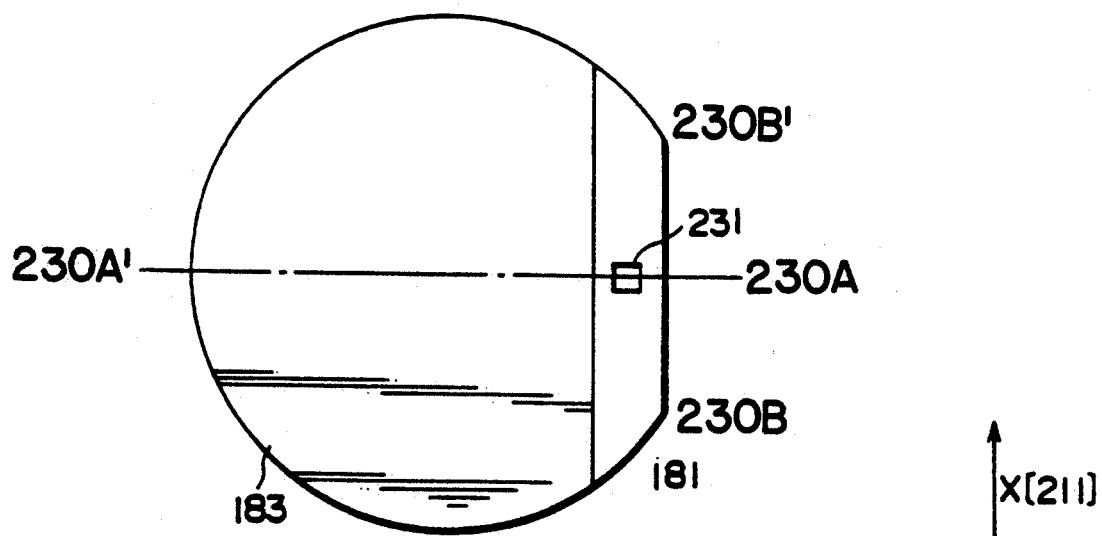
FIG. 23A is a plan view showing one mode of the recording medium of the present invention.
Figure 23B:
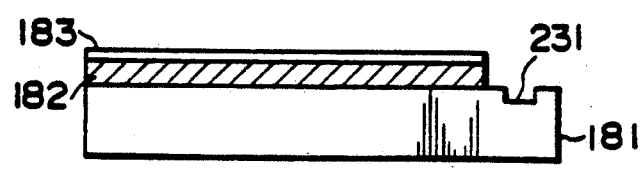
FIG. 23B is a A—A' sectional view thereof.

FIG. 23 shows a constitutional diagram of a recording medium. A P-type Si wafer with the (111) face exposed of ½ inch indiameter (B doped, 0.3 mm thickness) was used as the substrate 181. The substrate is cut at the 230B—230B' line for the purpose of setting the recording-reproducing device on the X-Y stage 180 in a constant direction. The 230B—230B' line is substantially in parallel to the ($\overline{2}11$) direction of the Si crystal. Next, the position of 1 mm from the center of 230B—230B' toward the substrate center is etched at 1 μm square to the depth of 0.2 μm to prepare the standard original point (coarse) 231. The method for preparing such standard original point (coarse) is shown below.

First, on the Si substrate, is applied polymethyl methacrylate (PMKA: trade name OEBR-1000, produced by Tokyo Oka Kogyo K.K.) which is an electron beam resist to a thickness of 1 μm, and an electron beam was projected to draw an image of a size of 1 μm square at an acceleration voltage of 20 keV and a beam diameter of 0.1 μm diameter. Then, by use of a developer suitable for this purpose, the electron-beam-irradiated portion was dissolved. For etching, a gas mixture of $CF_4$ and $H_2$ was employed to effect sputter etching under a pressure of 3 Pa and a discharging voltage of 100 W for 20 minutes. The etching depth at that time was 0.2 μm. Finally, PMMA was dissolved by use of methyl ethyl ketone.

On the substrate, masking was effected in the vicinity of the standard original point (coarse) 231, followed by deposition of Cr as the subbing layer to a thickness of 50 Å according to the vacuum vapor deposition method, and further Au was deposited to 400 Å by the same method to provide a substrate electrode 182.

On the Au electrode was laminated an LB film (8 layers) of squarilium-bis-6-octylazulene (hereinafter abbreviated as SOAZ) similarly as described above to provide a recording layer 101. That is, a benzene solution containing SOAZ at a concentration of 0.2 mg/ml dissolved therein is first spread on an aqueous phase of 20° C. to form a monomolecular film on the water surface. After evaporation of the solvent to enhance the surface pressure to 20 mN/m, and further while maintaining this pressure constantly, the above substrate was dipped and withdrawn gently at a speed of 3 mm/min. in the direction transversing the water surface repeatedly, thereby forming 8-layer built-up films of SOAZ monomolecular film on the substrate electrode 104.

With the respective parts constituted as above, and the experiment was practiced by use of the recording-reproducing device as described in FIG. 21.

The recording medium 184 having the recording layer 183 of built-up 8 SOAZ layers was placed on the X-Y stage 180 with the cutting 230B—230B' of the substrate set in a predetermined direction. Next, at the position inside of the substrate to about 1 mm from 230B—230B', the probe electrode 212 for positional detection was moved and, after application of a probe voltage of 0.6 V between the probe electrode for positional detection and the Si substrate 181, the X-direction of the X-Y direction fine adjustment mechanisms 173, 175a being tentatively adjusted in the direction substantially in parallel to 230B—230B', scanning was effected over a length of 1 μm. Next, scanning was also effected in the Y direction (the direction perpendicular to the X-direction) over 1 μm. Measurement of the surface state was repeated by varying the manner of taking the X-Y coordinate axes at this time, the arrangement pitches of Si atoms obtained were controlled to take the values most approximate to 6.65 Å and 3.84 Å, respectively. By such control, X-axis of the X-Y fine adjustment mechanism coincides with the ($\bar{1}$11) direction of the Si substrate, and the Y-axis with the (01$\bar{1}$) direction. At the same time, the X-Y direction of the coarse adjustment mechanism was controlled so as to coincide with the X-Y direction of the fine adjustment mechanism controlled within the control error range of the coarse adjustment mechanism. Next, by use of the coarse adjustment mechanism with respect to the X-Y direction, the position of the standard original point (coarse) 231 was detected by scanning the probe electrodes for positional detection by use of the coarse adjustment mechanism. At the position 2 mm toward the substrate center along the Y-axis direction from the center of such standard original point (coarse) 231, the lattice point of Si was detected. With such lattice points (the point C in FIG. 24) with the positional coordinate axis original point 241, the probe electrode -or positional detection 212 was scanned in the X-direction [($\bar{1}$11) direction]. During this operation, by confirming each lattice point 244 with respect to the ($\bar{2}$11) direction of Si, the directional control correction and confirmation of the positional coordinate (lattice pitch) were effected. In such operation, as associated with the probe electrode 212 for positional detection, the probe electrode 211 for recording-reproduction has also moved on the recording 183. In this embodiment, the distance between the both probe electrodes was 3 mm in the direction of Y-axis. Recording of a desired information was performed by use of such probe for recording-reproduction 211, but prior to practical recording, the standard original point (fine) 242 was provided at the recording position (the point C' in FIG. 24) corresponding to the positional coordinate original point 241. Such standard original point (fine) was formed by utilizing the electric memory effect of the recording layer 183. More specifically, between the probe electrode for recording-reproduction 211 and the Au electrode 182 was applied a probe voltage of 1.0 V, and the distance (Z) between the probe electrode for recording and reproduction 211 and the recording layer 183 was controlled by use of the fine adjustment mechanism 175b so that the probe current Ip may be $10^{-9}$A. With the probe electrode for recording-reproduction 211 on the + side and the Au electrode 182 on the − side, a rectangular pulse voltage (18 V, 0.1 μs) higher than the threshold voltage (Vth) for ON state at which the electric memory material (SOAZ, 8 layers of LB films) was changed to low resistance state (ON state) to cause the ON state to occur. The recording-reproduction method was as described above. When the probe current Ip was measured by applying a probe voltage of 1.0 V between the probe electrode for recording-reproduction 211 and the Au electrode 182, while maintaining the distance (Z) between the probe electrode for recording-reproduction and the recording layer 183, a current of about 0.5 mA was found to flow, whereby the ON state was confirmed to exist. By the operations as described above, the standard original point (fine) 242 was set. During this operation, by bringing the recording region of 10 nm square to ON state, the positional information as the original point concerning the standard point (fine) 242 was prevented from confused reproduction with the recording information written later (FIG. 24), but the shape of the standard original point (fine) 242 19 not limited to the shape of this embodiment at all.

Figure 24:
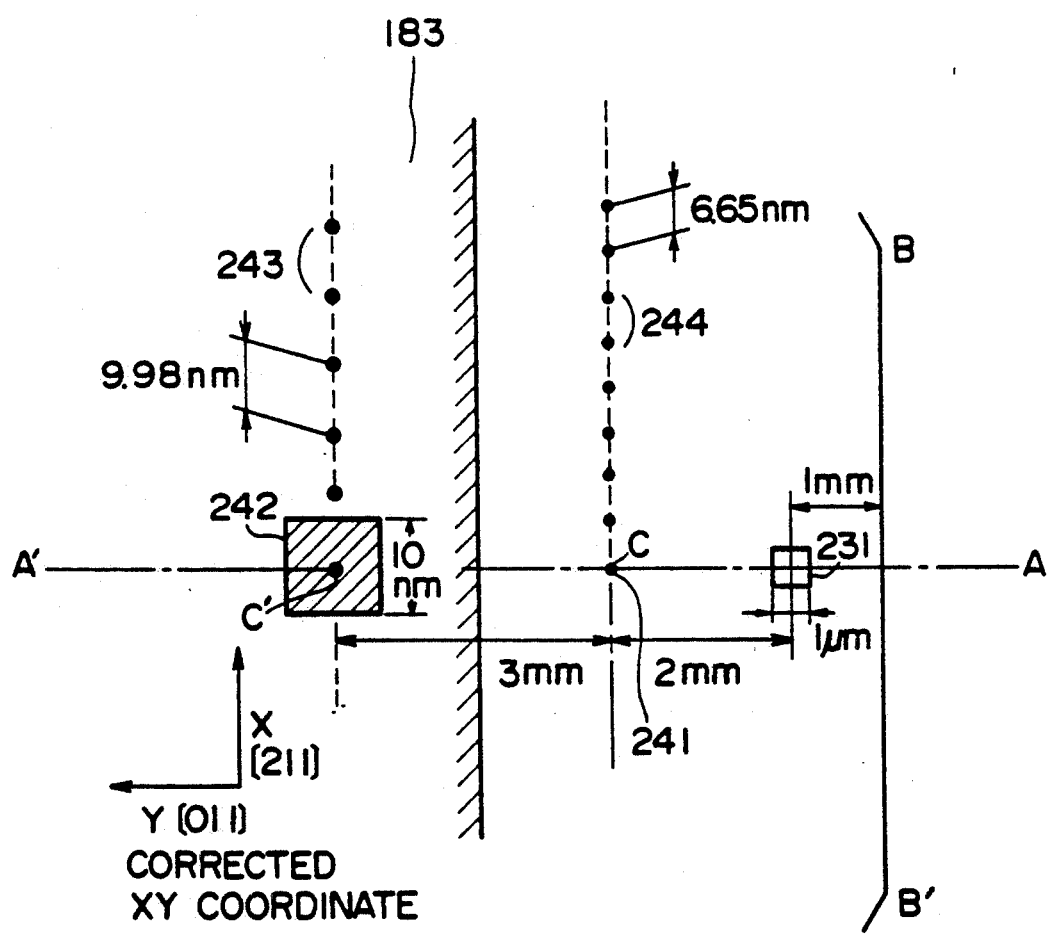
FIG. 24 is a schematic diagram showing one mode of the positional relationship between the coordinate axis and the recording position on the recording medium surface of the present invention.

Next, by scanning the probe electrode 212 for positional detection in the ($\bar{2}$11) direction while confirming the lattice point, recording was performed by use of the probe for recording-reproduction 211 which moves as associated simultaneously per 15 pitch (9.98 nm). Accordingly, the pitch of the recording point 243 was also 9.98 nm (FIG. 24). Such recording was performed by making the ON state and the OFF state (the high resistance state before recording) in the recording layer (SOAZ, 8 layers of LB films) 183 according to the same method as in formation of the standard original point (fine) 242.

After the recorded recording medium formed via the above steps was once removed from the recording-reproduction device, it was again set on the X-Y stage 180 to perform the reproduction experiment. First, similarly as during recording, after the X-Y direction of the positional control system was made in conformity with the ($\bar{2}$11) and (01$\bar{1}$) directions utilizing the Si lattice, respectively, the probe electrode for positional detection 212 was scanned with respect to the X-Y direction to detect the position of the standard original point (coarse) 231. Based on such standard original point (coarse; 231, the probe electrode 211 for recording-reproduction was scanned by use of fine and coarse adjustment mechanisms to detect the position of the standard original point (fine) 242. At the same time, the probe electrode for positional detection 212 was confirmed to exist on the Si lattice point (positional coordinate original point 241). In this case, if deviated, by use of a fine adjustment mechanism, X-Y coordinate system was corrected to control the probe electrode for positional detection 212 so as to coincide with the lattice point. Next, with a probe voltage of 0.6 V applied between the probe electrode for positional detection 212 and the Au electrode 182, scanning was effected in the ($\bar{2}$11) direction (X-axis direction) while detecting the position of the Si lattice point. During this operation, with a probe voltage of 1.0 V applied between the probe electrode for recording-reproduction 211 actuating at the same time and the Au electrode 182, reproduction of the information was performed by reading directly the change in the probe current quantity based on the ON state or OFF state at each recording point, or reading the change in distance Z between said probe electrode for recording-reproduction 182 and the surface of the recording layer 183 through the servo circuit 176 when the probe electrode for recording-reproduction 182 is scanned so that the probe current Ip may become constant.

The reproduction time at this time could be accelerated by about one digit as compared with the case when a tungsten probe, etc. of the prior art was used.

It was also confirmed that when the probe voltage was set at 10 V which is higher than the threshold voltage Vth OFF at which the electric memory material changes from the ON state to the OFF state and again the recording position was traced, all the recorded state was consequently erased to be transitioned to the OFF state.

In the following, another embodiment is shown. The probe electrode 4 in FIG. 17 was prepared according to the selective deposition method (See FIG. 13A–FIG.

Figure 13D:
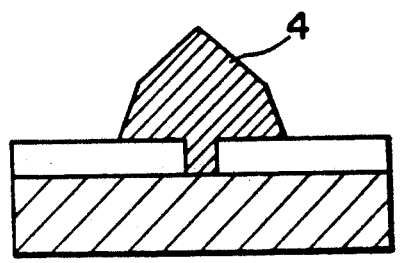

13D). As the result, a silicon single crystal 4 with a grain size of about 15 μm having an apex portion surrounded by the facet as shown in FIG. 13D was formed with the center at the opening 133.

By use of the probe electrode, recording and reproduction as in the above embodiment were performed. (See the recording-reproduction device shown in FIG. 7.)

The probe electrode 4 is provided for controlling the distance (Z) from the surface of the recording medium 184, and its distance (Z) is subjected to fine adjustment control by a piezoelectric device so that the current may be constantly maintained. Further, the fine adjustment mechanism is designed so that fine adjustment control may be also possible in the (X,Y) direction within the plane, while maintaining constantly the distance (Z).

The probe electrode 4 is used for performing relative directional positional detection within the recording medium plane and recording-reproducing-erasing. The recording medium 184 is placed on an X-Y stage 180 of high precision, and can be moved to any desired position (X-Y coarse adjustment mechanism). The X, Y directions of the coarse adjustment mechanism and the X,Y directions of the fine adjustment mechanism are coincident within the range of an error caused by the difference in precision between the respective adjustment mechanisms.

Figure 25A:
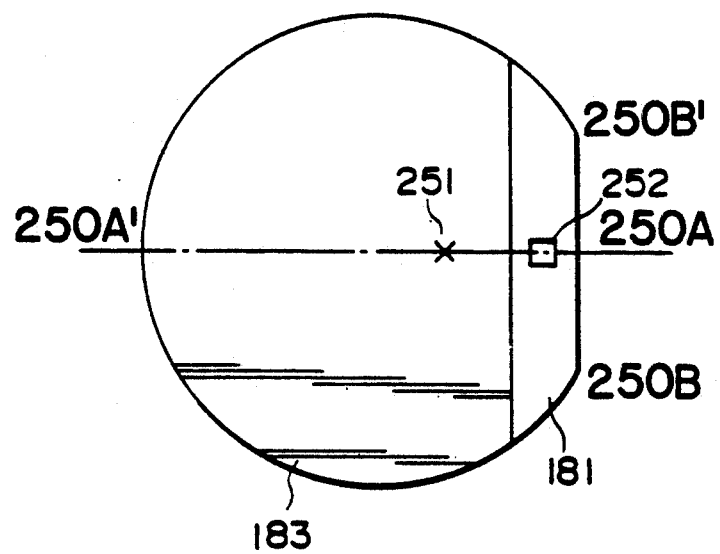
FIG. 25A is a plan view of the recording medium of the present invention.
Figure 25B:
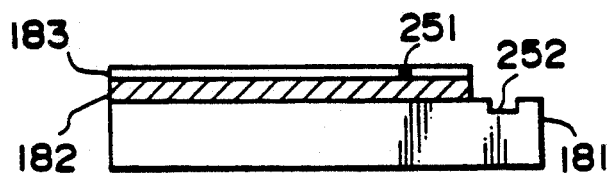
FIG. 25B is a A—A' sectional view thereof.

Next, a constitutional diagram of the recording medium used in this embodiment is shown in FIG. 25. FIG. 25A is a plan view of the recording medium used in the present invention, and FIG. 25B a cross-sectional view cut along 250A—250A' thereof. A P-type Si wafer with the (111) face exposed of ½ inch in diameter (B doped, 0.3 mm thick) was used as the substrate 181. The substrate is cut at the 250B—250B' point for the purpose of setting the recording-reproducing device on the X-Y stage 180 in a constant direction. The 250B—250B' point substantially in parallel to the ($\bar{2}$11) direction of the Si crystal.

Next, etching was effected at the position of 1 mm from the center of 250B—250B' toward the substrate center to 1 μm square and 0.2 μm depth to prepare the standard original point 252 (coarse). The method for preparing such standard original point (coarse) is shown below.

First, on the Si substrate is applied polymethyl methacrylate (PMMA: trade name OEBR-1000, produced by Tokyo Oka Kogyo K.K.) which is an electron beam resist to a thickness of 1 μm, and an electron beam was projected to draw an image of a size of 1 μm square at an acceleration voltage of 20 key and a beam diameter of 0.1 μm in diameter. Then, by use of a developer suitable for this purpose, the electron-beam-irradiated portion was dissolved. For etching, a gas mixture of $CF_4$ and $H_2$ was employed to effect sputter etching under a pressure of 3 Pa and a discharging voltage of 100 W for 20 minutes. The etching depth at that time was 0.2 μm. Finally, PMMA was dissolved by use of methyl ethyl ketone.

On the substrate, masking was effected in the vicinity of the standard original point (coarse) 252, followed by deposition of Cr as the subbing layer to a thickness of 50 Å according to the vacuum vapor deposition method, and further Au was deposited to 400 Å by the same method to provide a substrate electrode 182.

On the Au electrode was laminated an LB film (4 layers) of squarilium-bis-6-octylazulene (hereinafter abbreviated as SOAZ) to provide a recording layer 183. In the following, the method for forming the recording layer is to be described. First, a benzene solution containing SOAZ dissolved at a concentration of 0.2 mg/ml therein was spread on an aqueous phase of 20° C. to form a monomolecular film on the water surface. After evaporation of the solvent to raise the surface pressure to 20 mN/m, and further while maintaining this pressure constant, the above substrate was dipped and withdrawn gently at a speed of 3 mm/min in the direction tranversing the water surface repeatedly, thereby forming a 4-layer built-up films of SOAZ monomolecular film on the substrate electrode 182.

The recording-reproduction experiment was practiced by use of the recording medium 184 thus prepared.

The recording medium 184 having the recording layer 183 of built-up 4 SOAZ layers was placed on the X-Y stage 180 with the cutting 250B—250B' of the substrate, set in a predetermined direction.

Next, the probe electrode 4 was moved to the position of about 1 mm inside of the substrate from B—B' and, after application of a probe voltage of 0.6 V between the probe electrode and the Si substrate 181, the X-direction of the probe fine adjustment mechanisms 175, 176 are tentatively adjusted in the direction substantially in parallel to B—B', and scanning was effected over a length of 11 μm.

Next, scanning was also effected in the Y direction (the direction perpendicular to the X-direction) over 1 μm. Measurement of the surface state was repeated in diversified manners of taking the X-Y coordinate axes at this time, and the arrangement pitches of Si atoms obtained were controlled to take the values most approximate to 6.65 Å and 3.64 Å, respectively. By such control, the X-axis of the fine adjustment mechanism coincides with the ($\bar{2}$11) direction of the Si substrate, and the Y-axis with the (01$\bar{1}$) direction.

At the same time, the X-Y direction of the coarse adjustment mechanism was controlled so as to coincide with the X-Y direction of the fine adjustment mechanism controlled within the control error range of the coarse adjustment mechanism. Next, by scanning the probe electrode by use of the coarse adjustment mechanism with respect to the X-Y direction, the position of the standard original point (coarse) 252 was detected. At the position 2 mm toward the substrate center along the Y-axis direction from the center of such standard original point (coarse), the standard original point (fine) 251 was provided. Such standard original point (fine) is formed by utilizing the electric memory effect of the recording layer 183. More specifically, between the probe electrode 4 and the Au electrode 182 was applied a prove voltage of 1.0 V, and the distance (Z) between the probe electrode 4 and the recording layer 183 was controlled by use of the fine adjustment mechanism 175 so that the probe current Ip may be $10^{-9}$ A. Next, with the probe electrode 4 on the + side and the Au electrode on the − side, a rectangular pulse voltage (18 V, 0.1 μs) higher than the threshold voltage (Vth) for ON state at which the electric memory material (SOAZ, 4 layers of LB film) was changed to low resistance state (ON state) to cause the ON state to occur. When the probe current Ip was measured by applying a probe voltage of 1.0 V between the probe electrode 4 and the Au electrode 182, while maintaining the distance (Z) between the probe electrode 4 and the recording layer 183, a current of about 0.5 mA was found to flow, whereby the ON state was confirmed to exist. By the operations as described above, the standard original point (fine) 251 was set. During this operation, by bringing the recording region of 10 nm square to an ON state, the positional information concerning the standard point (fine) 251 was prevented from confused reproduction with the recording information written later (FIG. 26), but the shape of the standard original point (fine) 251 is not limited to the shape of this embodiment at all.

Figure 26:
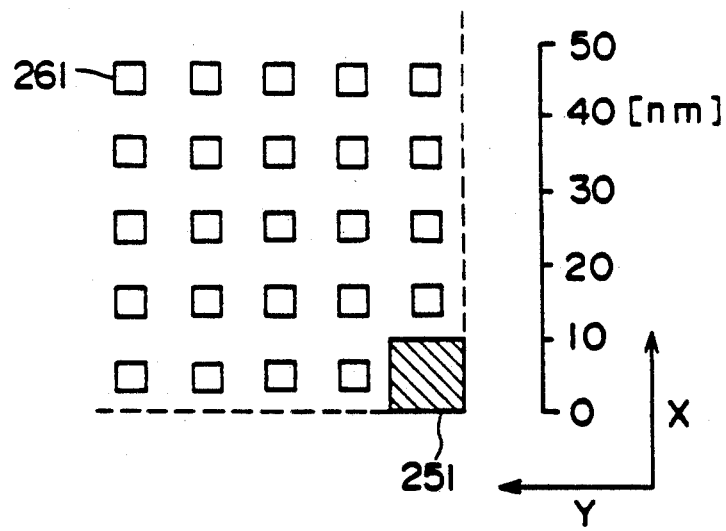
FIG. 26 is a schematic diagram showing the recording position on the recording material surface.

With such standard original point (fine) as the original point on the X-Y coordinate of the probe electrode position control system, the probe electrode 4 was scanned finely to effect recording of the information at 0.01 μm pitch. FIG. 26 shows schematically the recording position per one pit on the recording surface 183. Such recording was effected according to the same method as in formation of the standard original point (fine) by making ON state and OFF state (high resistance state before recording) on the electric memory material (SOAZ, 4 layers of LB film). (Recording (including reproduction) position corresponds to 261 in FIG. 26.)

The recorded recording medium 1 formed by the above steps was once taken off from the recording-reproduction device, and again set on the X,Y stage 180 to perform the reproduction test. First, similarly as in recording, after the X,Y directions of the position control system were adjusted to ($\bar{2}$11) and (01$\bar{1}$) directions, respectively, by utilizing the Si atom scale, the probe electrode was scanned with respect to the X,Y directions by use of a coarse adjustment mechanism to detect the position of the standard original point (coarse) 252. With such standard original point (coarse) as the basis, the standard original point (fine) 251 was sought out by use of coarse and fine adjustment mechanisms. With such standard original point (fine) as the original point for the X,Y coordinate system, the recorded information was reproduced. During this operation, with a probe voltage of 1.0 V for reproduction applied between the probe electrode 4 and the Au electrode 182, positional detection of the standard original point (fine) 251 and reproduction of the recorded information were performed by reading directly the probe current quantity flowing through the ON state and OFF state regions, or reading the change in distance Z between the prove electrode 4 and the surface of the recording layer 183 through the servo circuit 176 when the probe electrode 4 is scanned so that the probe current Ip may be constant.

It was also confirmed that when the probe voltage was set at 10 V which is higher than the threshold voltage (Vth) OFF at which the electric memory material changes from the ON state to the OFF state, and again the recording position was traced, all the recorded state was consequently erased to be transitioned to the OFF state.

In the following, still another embodiment is to be described.

An example in which recording and reproduction were conducted by setting the X,Y coordinate system of the probe electrode scanning system by use of the standard memory with a plural number of standard original points is shown below.

Figure 27A:
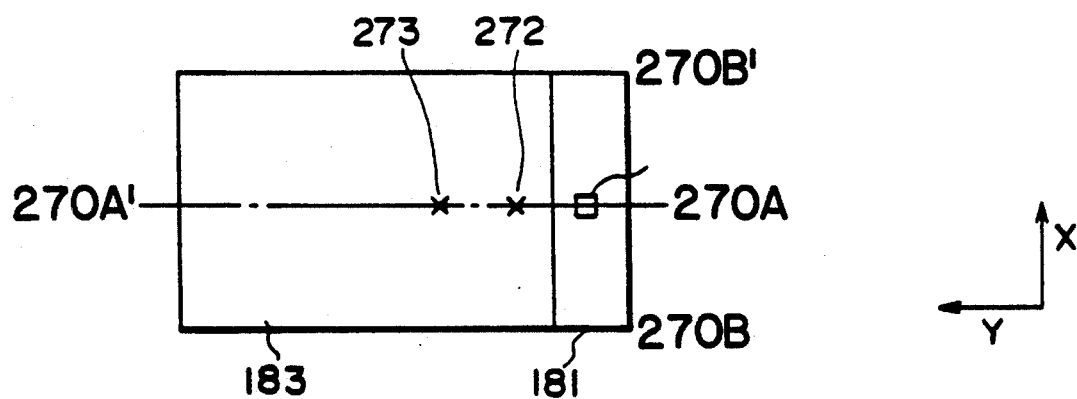
FIG. 27A is a plan view of another recording medium used in the present invention.
Figure 27B:
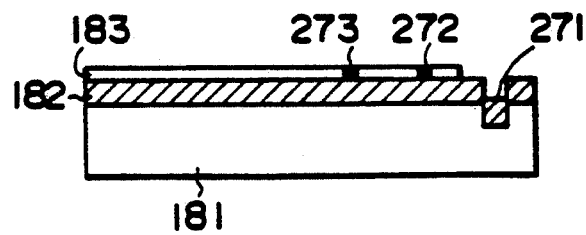
FIG. 27B a A—A' sectional view thereof.

FIG. 27 shows a constitutional diagram of the recording medium 184 used in this embodiment. As the substrate 181, a glass substrate (1 mm thickness) subjected to optical polishing of 0.7×1.5 cm was used. Next, a standard original point (coarse) 271 of 1 μm square and 0.1 μm deep was prepared at the position of 1 mm toward the substrate center from the center of 270B—270B'.

The method for preparing such standard original point (coarse) is shown below.

According to the photoresist method known in the art, a resist material (trade name: AZ 1360) was coated to a thickness of 1 μm and, after prebaking, UV-ray exposure by use of a mask, developing and post-baking were effected to form a mask pattern on the glass substrate. Next, based on the known $CF_4$ gas plasma etching method, the glass surface was subjected to dry etching to the depth of 0.1 μm under the conditions of an etching power of 50 W, a gas pressure of 1 Pa and a $CF_4$ gas flow rate of 15 SCCM. AZ 1360 of the mask was removed by washing with acetone.

Such substrate was left to stand in saturated vapor of hexamethyldisilazane to apply the hydrophobic treatment on the surface. On such substrate was deposited Cr as the subbing layer to a thickness of 50 Å according to the vacuum vapor deposition method, and further Au was vapor deposited to 400 Å according to the same method to provide a substrate electrode 182. Next, on such Au electrode was laminated a 10-layer LB film of t-butyl derivative of luthetium diphthalocyanine $(LuH(Pc)-_2)$ to form a recording layer 183. During this operation, care was taken so that no recording layer 183 was deposited in the vicinity of the standard original point (coarse) 271.

In the following, the film forming conditions of the LB film of t-butyl derivative of $LuH(Pc)_2$ are set forth.
Solvent: chloroform/trimethylbenzene/acetone = 1/½ (volume ratio)
Concentration: 0.5 mg/ml
Aqueous phase: pure water, water temperature 20° C.
Surface pressure: 20 mN/m
Substrate raising-lowering speed: 3 mm/min.

By use of the recording medium 184 prepared as described above, the tests of recording and reproduction were conducted as described in detail below.

With the B—B' direction of the recording medium 184 having a recording layer 183 with 10 layers of $LuH(Pc)_2$ t-butyl derivative LB film built up being adjusted toward the X-axis direction of the X-Y stage 180, it was set on such X-Y stage. Next, by scanning the probe electrode 4 by use of the coarse adjustment mechanism 179 with respect to the X-Y directions, the position of the standard original point (coarse) 271 was detected. The probe voltage was made 0.1 V. At the position (on the recording layer 183) 2 mm toward the substrate center in the Y-axis direction from such standard original point (coarse) 271, a first standard original point (fine) 272 was made by use of the same method as described above. In this case, the X-Y directions of the coarse adjustment mechanism and the X-Y directions of the fine adjustment mechanism are coincident with each other within the control error range of the coarse adjustment mechanism. Next, by use of the fine adjustment mechanism, a second standard original point (fine) 273 was made at the position 1 μm in the Y-axis direction from such first standard original point (fine) 272. The method for making such second standard original point (fine) 273 is the same as in making the first standard original point (fine), and the shapes of the respective points may also be made different for discrimination between the both, which however is not necessarily required, but there may be made a contrivance so that these points are not confused with the recording information in general. Next, by taking either one of such first standard original point (fine) 272 or second standard original point (fine) 273 as the original point of the X, Y axis coordinate system, the information was recorded at 0.01 μm pitch.

After the recorded recording medium 184 formed by the above steps was once taken off from the recording-reproduction device, it was again set on the X, Y stage 180 to perform the reproduction test. First, the standard original point (coarse) 271 is found by scanning the probe electrode with respect to X, Y directions by a coarse adjustment mechanism similarly as in recording, and on the basis of such standard original point (coarse), the first standard original point (fine) 272 was sought out by use of the coarse and fine adjustment mechanisms. Next, by use of the fine adjustment mechanism, the second standard original point (fine) 273 was detected, followed by reset of the X, Y coordinate system so that the direction of the line connecting the first and second standard original points (fine) may coincide with the Y-axis direction of the probe electrode scanning system. In this case, the first standard original point (fine) 272 or the second standard original point (fine) 273 was set so as to become the original point of such X, Y coordinate system in carrying out reproduction of the recorded information.

An electronic device utilizing the single crystal probe obtained in the present invention for an encoder for performing measurement such as position determination, measurement of dimensions, etc. is to be described.

Figure 29:
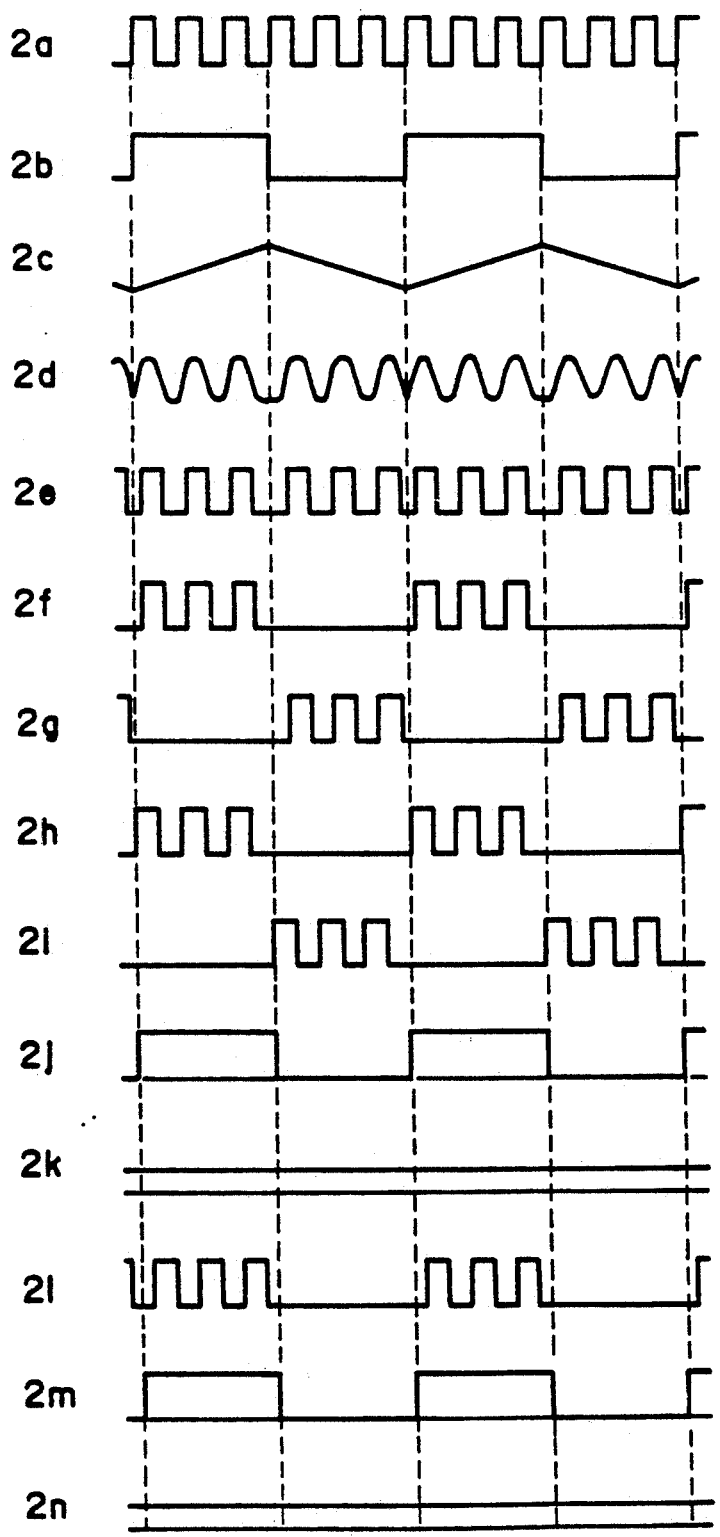

FIG. 28 shows the constitution of the encoder according to an embodiment of the present invention. FIG. 29 and FIG. 30 show the signals obtained in the respective constitutional parts of this embodiments.

In FIG. 28, the subject matter 281 and the subject matter 282 are set so that they can be only moved relatively in the lateral direction (left and right direction within the paper plane). The subject matter 282 is provided with an electroconductive standard scale 283, and the subject matter 281 with an electroconductive probe 284. Between the probe 284 and the standard scale 283 is applied a bias voltage by the bias power source 285. The tip end of the probe 284 and the standard scale 283 are approximated to each other to the extent that tunnel current flows therebetween. Here, tunnel current is converted by the current-voltage converting circuit 309 to voltage, which after amplified by the amplifying circuit 310 is subjected to logarithmic conversion by the logarithmic conversion circuit 291 in order to make the output signal proportional to the distance between the probe and the scale.

The probe 284 vibrates at a vibration number f and an amplitude d in the relative moving direction of the object matter 281 and the object matter 282 by means of the probe vibrating means 286. The vibration speed at this time is sufficiently greater than the relative moving speed of the subject matters 281 and 282. The prove vibration signal converts the rectangular wave 2a with a vibration number nf outputted from the oscillator 307 to a divided signal 2b in the frequency dividing circuit 304, to a triangular wave (signal 2c) with a vibration number f by the wave form converting circuit 303 and, after amplified by the amplifier 302 applied to the probe vibrating means 286. Here, in place of vibrating the probe, the standard scale may be also vibrated by providing a standard scale vibrating means on the object matter 282.

Further, when the object matter 281 and the object matter 282 are relatively moved laterally, the output signal from the logarithmic conversion circuit 291 is detected so that the average interval between the probe and the standard scale may become constant (so that the average value of the detected tunnel current may become constant), and if the detected tunnel-current value is deviated from the set value, by use of an average tunnel current value setting circuit 290 which will output the signal so as to correct its difference and further by use of a low pass filter 289 and the amplifying circuit 288, a feed-back group is formed to control the interval between the probe and the standard scale with the probe longitudinal position controlling means 287. At this time, the cut-off frequency of the low pass filter 289 is selected so that the rapid modulation component of the tunnel current caused to occur by scanning of the standard scale by the probe through vibration in the lateral direction of the probe over the standard scale and changing of the heights of the opposed portions of the standard scale and the probe may be removed, thereby permitting the slow change of the tunnel current by slanting of the standard scale, etc. during relative movement in the lateral direction of the object matter 281 and the object matter 282. Therefore, the probe longitudinal position control means 287 will not follow the tunnel current change by vibration, but performs the longitudinal position control of the probe by following only the tunnel current change through the relative movement of the object matters 281 and 282.

By vibration of the probe by the probe vibrating means 286, in the tunnel current flowing between the probe and the standard-scale, there appears the modulation component with a frequency of $(2p/d)f$ (p is the standard scale interval) by scanning of the probe over the standard scale. Here, if the object matter 281 and the object matter 282 move relatively in the lateral direction, the modulation component with a frequency of $(2p/d)f$ appearing in the above tunnel current will cause phase deviation relative to the standard signal (e.g. probe vibration signal). Since one period (phase deviation of $2\pi$) corresponds to the lateral laterial deviation between the probe and the standard scale corresponding to one scale of the standard scale, by detecting the phase deviation, the amount of the relative lateral movement of the object matter 281 and the object matter 282 can be detected. In this case, even when there may be a defect, etc. of the standard scale, only a part of the waveform of the signal is disturbed to have hardly influence on the phase deviation, whereby precision deterioration due to external disturbance such as defect, etc. is not easily effected.

Referring now to FIG. 29 and FIG. 30, the system of signal processing is to be described.

The modulation component with a frequency of $(2p/d)f$ appearing in the tunnel current is taken out (2d, in the Figure) via the current-voltage conversion circuit 309, the amplification circuit 310, the logarithmic conversion circuit 291, the band-pass filter 292, and after binary conversion to through the binary circuit 293, the signal 2e is obtained. Here, the amplitude of the probe vibrating signal 2c (the gain of the amplifying circuit 302) applied on the probe vibrating means 286 is controlled so as to give $d=2p/n$, whereby the frequency of the signal 2e is permitted to coincide with nf. Further, with the signal 2b having the frequency of the signal 2a from the oscillator 307 divided to 1/n by the frequency dividing circuit 304 as the reference signal, the signal 2e is divided by the gate circuit 294 into the two signals 2f, 2g.

Also, the signal 2a is divided by the gate circuit 305 into the two signals 2h, 2i with the signal 2b as the reference signal.

Here, the signals 2f and 2h are inputted into a phase comparator 295, and the phase difference output 2j signal is averaged by an averaging circuit 296 to obtain the signal 2k. When the object matter 281 and the subject matter 282 move relatively in the lateral direction, the signal 2k will change as the signal 3a corresponding to its relative movement amount.

Further, every time when phase difference become $2n\pi$ (n: integer), for example, the zero-cross point of the phase difference output signal 2k(3a) is detected by the binary conversion circuit 297 to generate pulses (signal 3b), and the relative phase deviation between the signal 2f and the signal 2h (encoder output signal 3c) can be detected by counting the pulse number by an up-down counter 298. At this time, the phase deviation directional signal inputted into the counter 298, namely the up-down condition (mark) is determined as follows.

From the output signal 2a from the oscillator 307, by use of the phase shifter 308 and the gate circuit 306, a signal 2l deviated by 90° in phase relative to the signal 2h is formed. By inputting the signal 2f and the signal 22 into the phase comparator 299, the phase difference output signal 2m is averaged by the averaging circuit 300 to obtain the signal 2n. Similarly as the signal 2k, when the object matter 281 and the object matter 282 move relatively in the lateral direction, the signal 2n will change as the signal 3d corresponding to its relative movement amount. Further, the signal 3d is converted to binary value by the binary conversion circuit 301 to give a phase deviation directional signal, namely the up-down signal 3e inputted to the up-down counter.

If the up-down signal 3e at the rising points (3b₁, 3b₂, 3b₃) of the movement amount pulse signal 3bis +, the up-down counter 298 adds the pulse number. On the contraty, it the up-down signal 3e at the stand-up points is −, the pulse number is detracted.

Thus, the lateral direction relative movement amount of the object matter 281 and the object matter 282 can be detected. In the system according to this embodiment, one period of phase deviation ($2\pi$) corresponds to the relative movement amount of one scale of the standard scale. Even if there may be a defect, etc. in the standard scale, only a part of the waveform of the signal is disturbed, and the value of phase deviation will be hardly affected thereby. Therefore, the measured value can maintain accurateness even by external disturbance. Also, although nothing is mentioned in this embodiment, the relative movement amount can be also detected by performing the same signal processing for the signal 2g, 2i.

The single crystal probe 284 used in the above embodiment (the encoder in FIG. 28) is prepared by use of the method of crystal growth shown in FIG. 13. Shortly speaking, the single crystal probe, as shown in FIG. 16, has each facet comprising four (111) faces 162a, eight faces 162b and a high-dimensional crystal face 163 between (311) and (411), and forms an apex portion 161 with four triangular faces 163.

By mounting the single crystal probe on an encoder, an encoder of high performance and high resolving power can be confirmed to be provided, which proved to be advantageous in high speed vibration due to strong resistance to electrical noise, vibration (sound, earthquake, etc.) and high rigidity and is also excellent in aspects of reproducibility of information, stability of the device.

As described above, the microprobe of the present invention is a single crystal probe having a sharp apex portion with a size of atomic level surrounded by facets having specific face directions and comprising specific crystal faces, and also having high rigidity without working distortion, and is therefore very useful in practical application.

These single crystal probes can be freely selected either singly or in a plural number, and besides, they can be formed at any desired position with good controllability according to the present invention. For this reason, it is possible to make the production method high in yield and yet excellent in productivity at low cost by controlling the process.

The microprobe of the present invention can be applied for broad scope of applications because all of conductors, semiconductors, non-conductors can be selected as the constituent material.

In the production method of the present invention, since a single crystal having a facet structure is grown, a microprobe having a curvature of radius of molecular level or atomic level can be obtained with good reproducibility by controlling accurately the production process conditions.

In the microprobe of the present invention, a draw-out electrode or a current amplifier can be formed in adjacent form. Particularly, the S/N ratio on account of an amplifier adjacent to the single crystal probe can be improved by about 1 to 2 digits as compared with the current amplification of the microprobe of the prior art. Also, the preparation steps for providing a draw-out electrode or an amplifier can be easily incorporated in a series of preparation steps of the single crystal probe, and the single crystal probe can be formed without damage.

Further, by permitting a plural number of probe electrodes actuated independently, for example there is the effect that recording to a plural number of sites and reproduction from a plural number of sites can be done simultaneously in high density recording-reproduction device.

What is claimed is:

1. An electronic device for performing recording and reproduction, comprising a probe electrode constituted of a single crystal, a recording medium provided in opposition to said probe electrode, means for applying a voltage between said probe electrode and said recording medium, means for moving said probe for recording and/or reproducing information at different positions on said recording medium and means for detecting the position of said probe on said recording medium, wherein said single crystal has an apex surrounded by facets having a specific plane direction and including a specific crystal face.

2. An electronic device according to claim 1, wherein the crystal face of the facet of said probe electrode is constituted of single crystals of (411) or (311) directions.

3. An electronic device according to claim 1, having a probe electrode equipped with an amplifier adjacent to said single crystal.

4. An electronic device according to claim 1, wherein a plural number of said probe electrodes are provided.

5. An electronic device according to claim 1, wherein said recording medium has a positional coordinate axis which functions as a standard and said detecting means detects the position on said positional coordinate axis, thereby performing recording, reproduction or erasing of the recorded information at the position of said recording medium corresponding to the coordinate position detected.

6. An electronic device according to claim 5, wherein the positional coordinate axis which functions as said standard is a coordinate axis based on atomic arrangement.

7. An electronic device according to claim 5, wherein the original point which functions as the standard is provided on at least one of the positional coordinate axis which functions as said standard and the position of the recording medium corresponding thereto.

8. An electronic device according to claim 5, wherein a plural number of the positional coordinate axis which functions as said standard are formed.

9. An electronic device according to claim 5, having a plural number of said probe electrodes, of which one probe electrode is used for detection of the positional coordinate is used, and the other probe electrodes for recording or reproduction.

10. An electronic device according to claim 1, wherein said recording medium has as electric memory effect.

11. An electronic device according to claim 1, wherein said recording medium has a standard scale which becomes a standard within the plane, and said detecting means detects a relative deviation within the recording medium plane between said standard scale and the probe electrode.

12. An electronic device according to claim 11, wherein said standard scale is a scale based on atomic arrangement.

13. An electronic device according to claim 11, wherein said standard scale has an original point which becomes the standard.

14. An electronic device according to claim 11, wherein a plural number of said standard scales are provided.

15. An electronic device according to claim 1, wherein said probe electrode is a probe electrode formed through a step of providing on a part of one main surface of a substrate or on a part of a thin film formed on one main surface of the substrate a different material having nucleation density sufficiently larger than said substrate or thin film, and being small to such an extent that only a single nucleus can be grown thereon, and a step of forming a single crystal by growing a single nucleus on said material.

16. An electronic device according to claim 1, wherein said probe electrode is a probe electrode formed through a step of laminating on a single crystal substrate an insulating layer having an opening so that a part of said single crystal substrate may be exposed, and a step of growing a single crystal having an apex portion surrounded by facets having a specific plane direction and comprising a specific crystal face by selective epitaxial growth from said opening.

17. An encoder, comprising an electroconductive standard scale which becomes a standard with respect to a length on a surface, an electroconductive probe constituted of a single crystal with a tip thereof being arranged in proximity to said standard scale surface, means for applying voltage between said standard scale and said probe, means for detecting a tunnel current value flowing between said standard scale and said probe and outputting a signal corresponding to a relative movement amount in a lateral direction between said standard scale and said probe based on said tunnel current value, means for detecting the relative movement amount and the lateral direction between said standard scale and said probe based on the signal from said signal outputting means, and means for counting a relative deviation amount in the lateral direction between said standard scale and said probe from said relative movement amount in the lateral direction and said relative movement direction, wherein said single crystal has an apex portion surrounded by facets having a specific plane direction and including a specific crystal face.

18. An encoder according to claim 17, wherein said probe has a facet face of (411) to (311) directions.

19. An encoder according to claim 17, which is provided with an electrode wiring adjacent to said probe.

20. An encoder according to claim 17, which is provided with an amplifier adjacent to said probe.

* * * * *

UNITED STATES PATENT AND TRADEMARK OFFICE
CERTIFICATE OF CORRECTION

PATENT NO. : 5,255,258
DATED : October 19, 1993
INVENTOR(S) : HISAAKI KAWADE, ET AL.

Page 1 of 7

It is certified that error appears in the above-identified patent and that said Letters Patent is hereby corrected as shown below:

ON TITLE PAGE

Between [22] and [60], insert:

-- [30] FOREIGN APPLICATION PRIORITY DATA

| Sep. 24, 1987 | [JP] | Japan | 62-237499 |
| Sep. 24, 1987 | [JP] | Japan | 62-237500 |
| Dec. 18, 1987 | [JP] | Japan | 62-318951 |
| Sep. 6, 1988 | [JP] | Japan | 63-221403 |
| Sep. 7, 1988 | [JP] | Japan | 63-222232 |
| Sep. 12, 1988 | [JP] | Japan | 63-226420 --. |

IN [56] REFERENCES CITED

Under FOREIGN PATENT DOCUMENTS:
"62-209302  3/1988  Japan" should read
--62-209302  3/1987  Japan--.

On drawing sheet

SHEET 14 OF 20

FIG. 22, "RECORING" should read --RECORDING--.

COLUMN 1

Line 44, "lications" should read --applications--.
Line 65, "a a" should read --a--.

COLUMN 2

Line 39, "tic" should read --tip--.
Line 58, "bend" should read --bent--.
Line 61, "his" should read --has--.

--

UNITED STATES PATENT AND TRADEMARK OFFICE
CERTIFICATE OF CORRECTION

PATENT NO. : 5,255,258
DATED : October 19, 1993
INVENTOR(S) : HISAAKI KAWADE, ET AL.

It is certified that error appears in the above-identified patent and that said Letters Patent is hereby corrected as shown below:

COLUMN 3

Line 42, "i" should read --a--.
Line 68, "skid" should read --said--.

COLUMN 4

Line 36, "A-A and B-B" should read --3A-3A' and 3B-3B'--.
Line 42, "A-A and B-B" should read --6A-A' and 6B-6B'--.
Line 54, "A-A and B-B" should read --3A-3A' and 3B-3B'--.

COLUMN 5

Line 6, "A-A'" should read --230A-230A'--.
Line 12, "A-A'" should read --250A-250A'--.
Line 18, "A-A'" should read --270A-270A'--.

COLUMN 6

Line 1, "raid" should read --said--.
Line 27, "probe W," should read --probe 4,--.
Line 38, "lead" should read --being led--.
Line 42, "A." should be deleted.
Line 55, "luthenium," should read --ruthenium,--.

COLUMN 7

Line 8, "was deposited" should read --a layer was deposited--.
Line 12, "are" should read --were--.
Line 32, "the thin film resistance 35" should read --thin film resistor 35--.

UNITED STATES PATENT AND TRADEMARK OFFICE
CERTIFICATE OF CORRECTION

PATENT NO. : 5,255,258
DATED : October 19, 1993
INVENTOR(S) : HISAAKI KAWADE, ET AL.

It is certified that error appears in the above-identified patent and that said Letters Patent is hereby corrected as shown below:

COLUMN 7

Line 42, "view" should read --views--.
Line 46, "fferent" should read --different--.
Line 56, "the thin film resistance 35" should read
--thin film resistor 35--
Line 61, "0.1 m" should read --0.1 µm--.

COLUMN 8

Line 4, "silicon." should read --silicon--.
Lines 39-40, "the thin film resistance 35" should read
--thin film resistor 35--.
Line 58, "ad" should read --and--.

COLUMN 9

Line 6, "tances" should read --tors--.
Line 7, "thenixim," should read --thenium,--.
Line 55, "alay" should read --may--.

COLUMN 11

Line 17, "$SiH_2,Cl_2$:" should read --$SiH_2Cl_2$--.

COLUMN 12

Line 7, "facets" should read --facet--.
Line 49, "recording/crazing" should read
--recording/erasing--.
Line 65, "(nX order)" should read --(nm order)--.

UNITED STATES PATENT AND TRADEMARK OFFICE
CERTIFICATE OF CORRECTION

PATENT NO. : 5,255,258

DATED : October 19, 1993

INVENTOR(S) : HISAAKI KAWADE, ET AL.

It is certified that error appears in the above-identified patent and that said Letters Patent is hereby corrected as shown below:

COLUMN 13

Line 7, "prove" should read --probe--.
    Line 63, "racyancethylene" should read --racyanoethylene--.

COLUMN 14

Line 13, "grow" should read --glow--.
    Line 20, "r electron" should read --π electron--.
    Line 21, "(i electron" should read --σ electron--.
    Line 24, "skelton" should read --skeleton--.
    Line 29, "beniothiazole" should read --benzothiazole--.
    Line 31, "dyes fused" should read --dyes, fused-- and "aromatic" should read --aromatics--.

COLUMN 15

Line 6, "x electron" should read --π electron--.

COLUMN 17

Line 52, "[III]" should read --[II]--.

COLUMN 21

Line 61, "items 8" should read --items--.

COLUMN 22

Line 57, "prove" should read --probe--.

COLUMN 23

Line 29, "redius" should read --radius--.

UNITED STATES PATENT AND TRADEMARK OFFICE
CERTIFICATE OF CORRECTION

PATENT NO. : 5,255,258
DATED : October 19, 1993
INVENTOR(S) : HISAAKI KAWADE, ET AL.

It is certified that error appears in the above-identified patent and that said Letters Patent is hereby corrected as shown below:

COLUMN 24

Line 5, "exist," should read --existing,--.
Line 6, "In" should read --in--.

COLUMN 25

Line 50, "discrimianted," should read --discriminated,--.

COLUMN 26

Line 21, "(PMKA:" should read --(PMMA:--.

COLUMN 27

Line 9, "($\bar{1}$11)" should read --($\bar{2}$11)--.
Line 25, "-or" should read --or--.
Line 27, "[($\bar{1}$11)" should read [($\bar{2}$11)--.

COLUMN 28

Line 4, "242 19" should read --242 is--.

COLUMN 29

Line 39, "point" should read --point is--.
Line 52, "20 key" should read --20 keV--.

COLUMN 30

Line 21, "B-B'" should read --250B-250B'--.
Line 26, "B-B'," should read --250B-250B',--.

UNITED STATES PATENT AND TRADEMARK OFFICE
CERTIFICATE OF CORRECTION

PATENT NO. : 5,255,258
DATED : October 19, 1993
INVENTOR(S) : HISAAKI KAWADE, ET AL.

It is certified that error appears in the above-identified patent and that said Letters Patent is hereby corrected as shown below:

COLUMN 30

Line 27, "11 µm." should read --1 µm.--.
Line 53, "prove" should read --probe--.

COLUMN 31

Line 45, "prove" should read --probe--.

COLUMN 32

Line 24, "luthetium" should read --lutetium--.
Line 25, "(LuH(Pc)$_{-2}$)" should read --(LuH(Pc)$_2$)--.
Line 40, "B—B'" should read --270B—270B'--.

COLUMN 33

Line 56, "prove" should read --probe--.

COLUMN 34

Line 40, "laterial" should be deleted.

COLUMN 35

Line 11, "become" should read --becomes--.
Line 24, "signal 22" should read --signal 21--.
Line 36, "3bis" should read --3b is--.
Line 38, "contraty," should read --contrary,-- and "it" should read --if--.
Line 39, "detracted." should read --subtracted.--.
Line 53, "signal" should read --signals--.

UNITED STATES PATENT AND TRADEMARK OFFICE
CERTIFICATE OF CORRECTION

PATENT NO. : 5,255,258

DATED : October 19, 1993

INVENTOR(S) : HISAAKI KAWADE, ET AL.

It is certified that error appears in the above-identified patent and that said Letters Patent is hereby corrected as shown below:

COLUMN 36

Line 23, "curvature of radius" should read --radius of curvature--.

COLUMN 37

Line 20, "is used," should be deleted.

COLUMN 38

Line 39, "to" should read --or--.

Signed and Sealed this

Sixteenth Day of August, 1994

Attest:

BRUCE LEHMAN

Attesting Officer    Commissioner of Patents and Trademarks